(12) United States Patent  
Ryu et al.

(10) Patent No.: US 10,856,131 B2
(45) Date of Patent: Dec. 1, 2020

(54) METHOD FOR UPDATING UE CONFIGURATION IN WIRELESS COMMUNICATION SYSTEM AND APPARATUS FOR SAME

(71) Applicant: LG ELECTRONICS INC., Seoul (KR)

(72) Inventors: Jinsook Ryu, Seoul (KR); Sangmin Park, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,097

(22) PCT Filed: Jan. 16, 2018

(86) PCT No.: PCT/KR2018/000737
§ 371 (c)(1),
(2) Date: Jun. 21, 2018

(87) PCT Pub. No.: WO2018/131984
PCT Pub. Date: Jul. 19, 2018

(65) Prior Publication Data
US 2019/0373441 A1    Dec. 5, 2019

Related U.S. Application Data

(60) Provisional application No. 62/446,786, filed on Jan. 16, 2017, provisional application No. 62/459,619, (Continued)

(51) Int. Cl.
*H04W 8/08* (2009.01)
*H04W 60/00* (2009.01)
(Continued)

(52) U.S. Cl.
CPC ............ *H04W 8/08* (2013.01); *H04W 48/18* (2013.01); *H04W 60/00* (2013.01); *H04W 68/005* (2013.01); *H04W 76/27* (2018.02)

(58) Field of Classification Search
CPC ....... H04W 8/08; H04W 76/27; H04W 48/18; H04W 60/00; H04W 68/005
See application file for complete search history.

(56) References Cited

U.S. PATENT DOCUMENTS 10,419,979 B2 *   9/2019  Youn .................... H04W 76/12
2008/0259876 A1 * 10/2008  Qiang ............... H04W 36/0066
                                                    370/332

(Continued)

FOREIGN PATENT DOCUMENTS

CN         101621786      1/2013
CN         105188111      12/2015
(Continued)

OTHER PUBLICATIONS

PCT International Application No. PCT/KR2018/000737, International Search Report dated May 2, 2018, 4 pages.
(Continued)

Primary Examiner — Stephen J Clawson
(74) Attorney, Agent, or Firm — Lee, Hong, Degerman, Kang & Waimey

(57) ABSTRACT

Disclosed are a method for updating a UE configuration in a wireless communication system and an apparatus for the same. Specifically, a method for updating a configuration of a user equipment (UE) by an access and mobility management function (AMF) in a wireless communication system may comprise the steps of: determining whether it is necessary to change a configuration of the UE without a request from the UE; and when it is necessary to change the configuration of the UE, transmitting a UE configuration update command message to the UE, wherein the UE (Continued)

configuration update command message comprises updated UE parameters.

15 Claims, 22 Drawing Sheets

Related U.S. Application Data filed on Feb. 16, 2017, provisional application No. 62/492,967, filed on May 2, 2017, provisional application No. 62/501,110, filed on May 4, 2017, provisional application No. 62/543,990, filed on Aug. 11, 2017.

(51) Int. Cl.
*H04W 48/18* (2009.01)
*H04W 68/00* (2009.01)
*H04W 76/27* (2018.01)

(56) References Cited

U.S. PATENT DOCUMENTS

| | | | | |
|---|---|---|---|---|
| 2010/0097641 | A1* | 4/2010 | Takeshita | G06F 3/1203 358/1.15 |
| 2012/0157132 | A1* | 6/2012 | Olsson | H04W 68/00 455/458 |
| 2013/0039244 | A1 | 2/2013 | Sun | |
| 2013/0304616 | A1* | 11/2013 | Raleigh | G06Q 20/145 705/34 |
| 2016/0066219 | A1* | 3/2016 | Poikonen | H04W 8/12 455/436 |
| 2016/0205625 | A1 | 7/2016 | Stojanovski et al. | |
| 2017/0324652 | A1* | 11/2017 | Lee | H04L 67/322 |
| 2018/0098311 | A1* | 4/2018 | Hong | H04L 67/327 |
| 2018/0227872 | A1* | 8/2018 | Li | H04W 8/02 |
| 2018/0270896 | A1* | 9/2018 | Faccin | H04W 4/70 |
| 2018/0376446 | A1* | 12/2018 | Youn | H04W 8/20 |

FOREIGN PATENT DOCUMENTS

| | | |
|---|---|---|
| EP | 1351424 | 10/2003 |
| EP | 2427029 | 7/2012 |
| KR | 101539882 | 8/2015 |

OTHER PUBLICATIONS

LG Electronics, et al., "TS 23.502 P-CR new procedure on NW initiated UE configuration update", S2-171854, SA WG2 Meeting #120, Mar. 2017, 5 pages.

European Patent Office Application Serial No. 18738504.2, Search Report dated Jun. 13, 2019, 12 pages.

LG Electronics, et al., "TS 23.502 P-CR new procedure on NW initiated UE configuration update", SA WG2 Meeting #119, S2-170854, Feb. 2017, 4 pages.

European Patent Office Application Serial No. 18738504.2, Office Action dated Oct. 19, 2020, 8 pages.

LG Electronics, "TS 23.501 Update to Mobility Restriction," SA WG2 Meeting #120, S2-171855, Mar. 2017, 3 pages.

* cited by examiner

[FIG. 1]
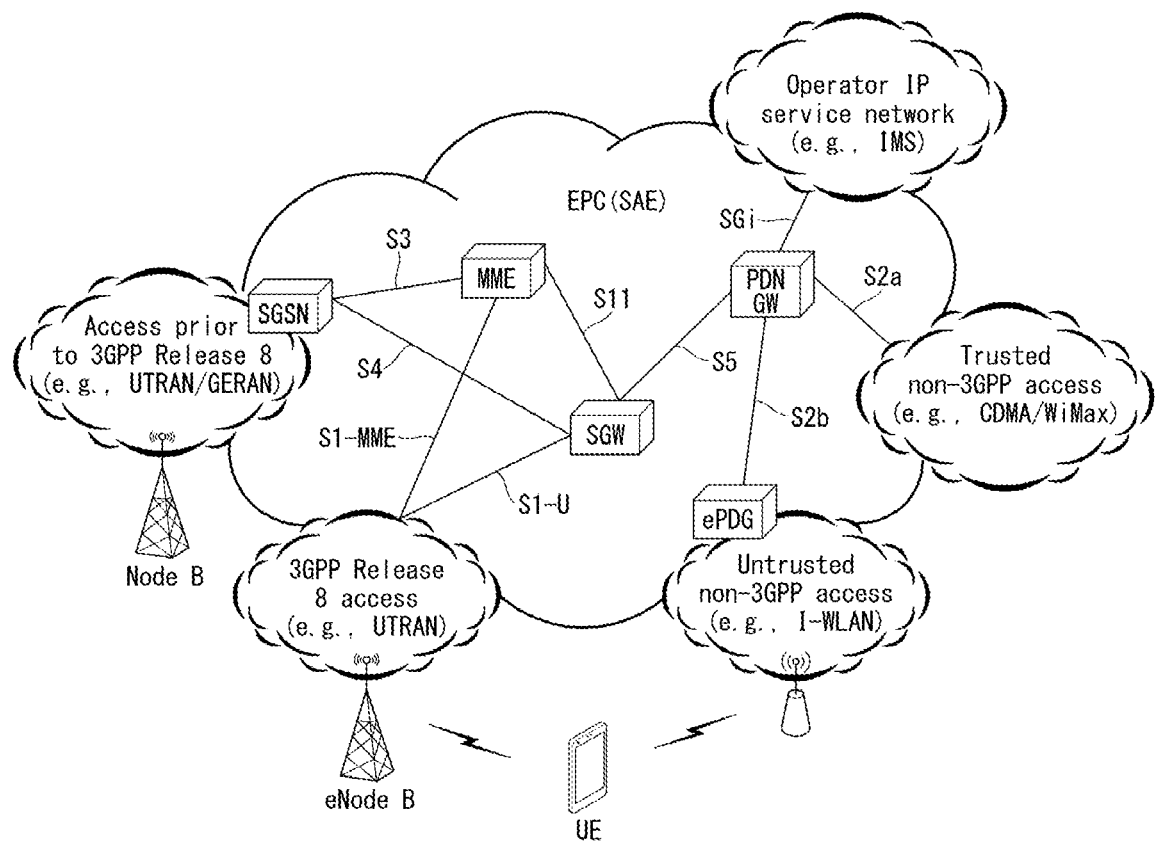

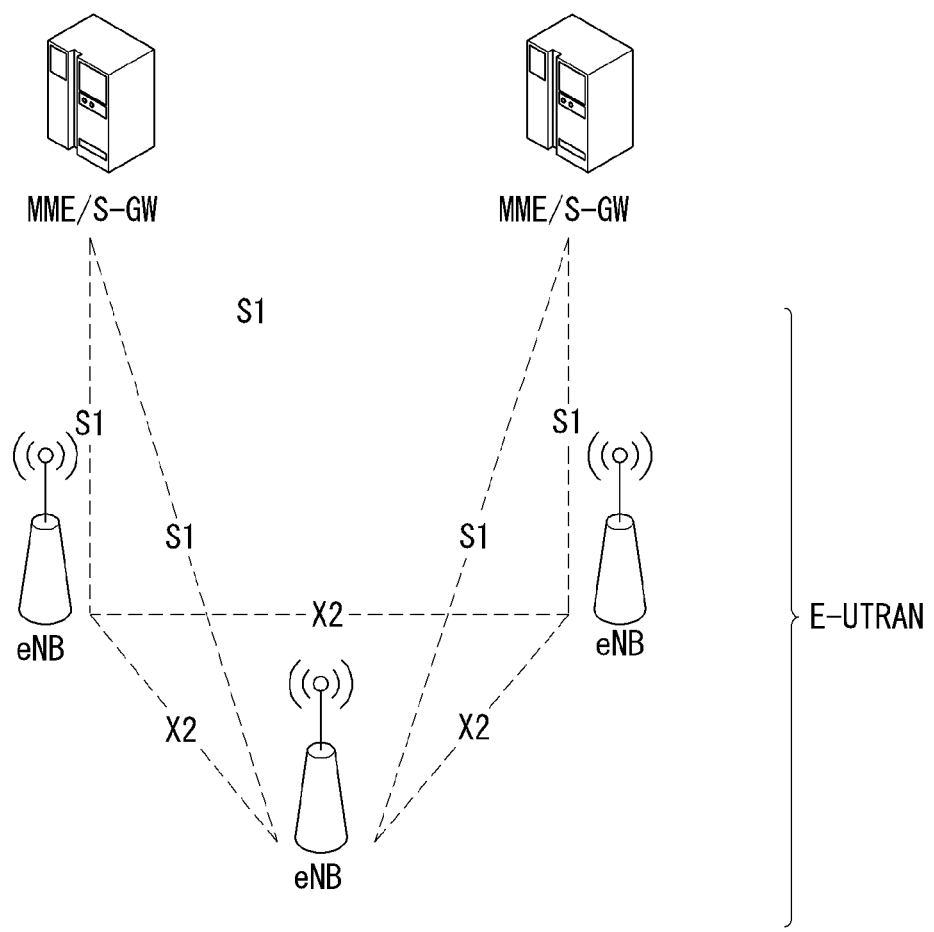
[FIG. 2]

[FIG. 3]
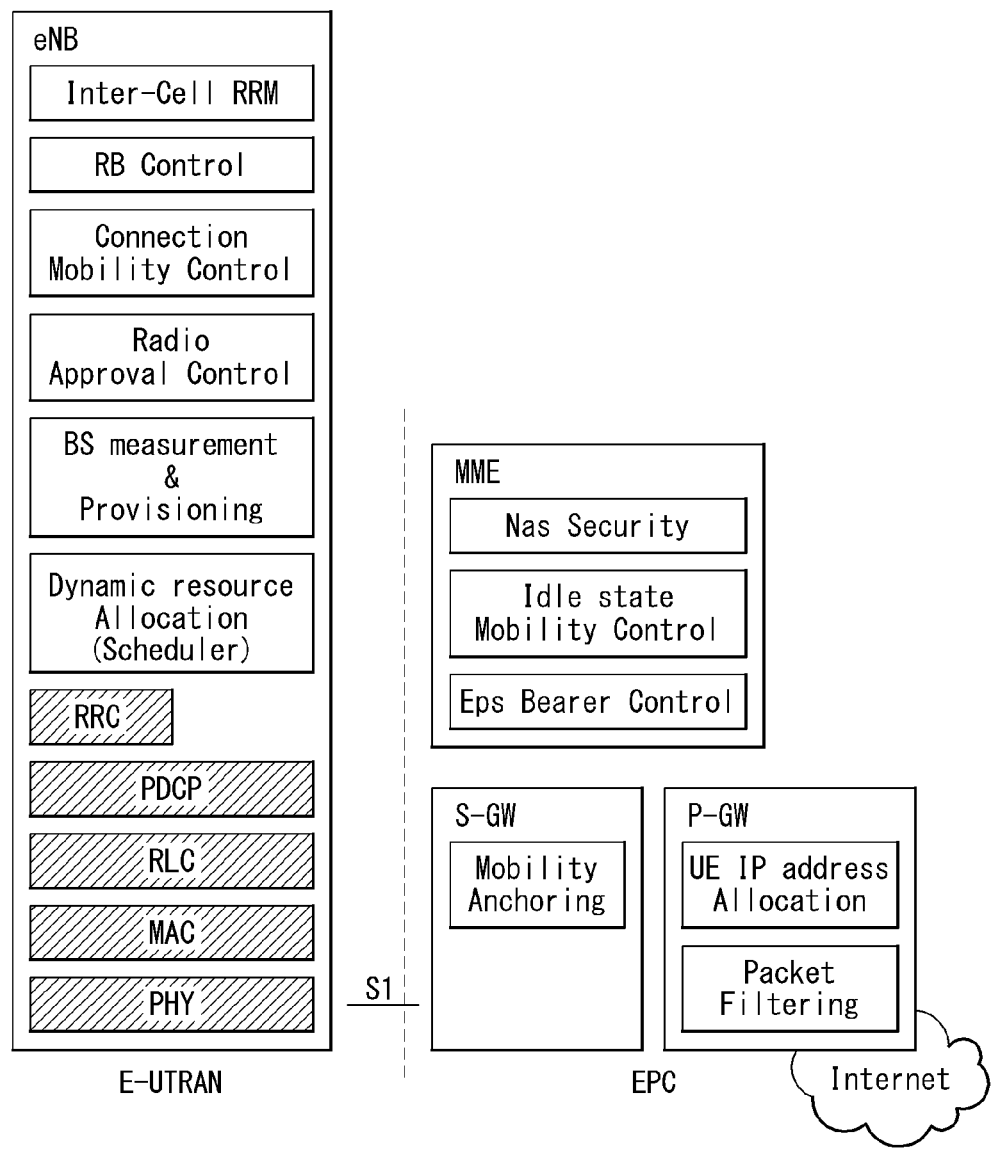

[FIG. 4]
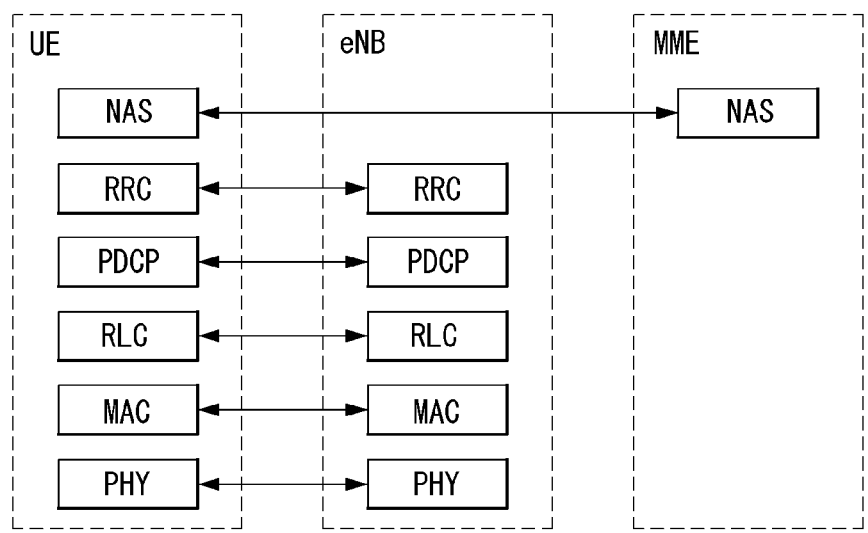
(a) Control plane protocol stack
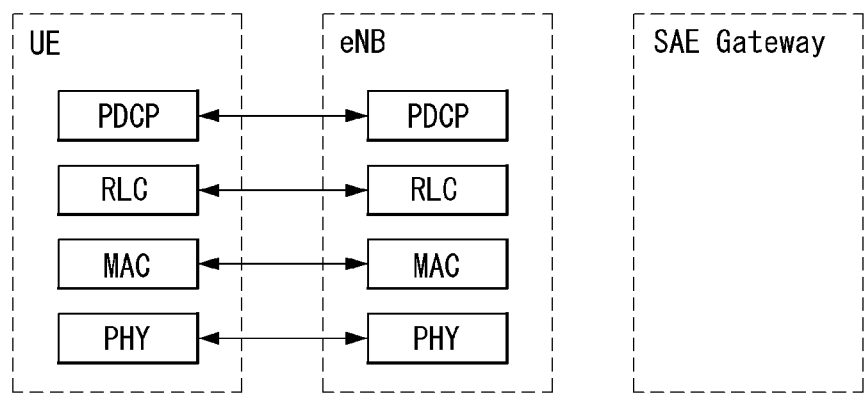
(b) User plane protocol stack

[FIG. 5]
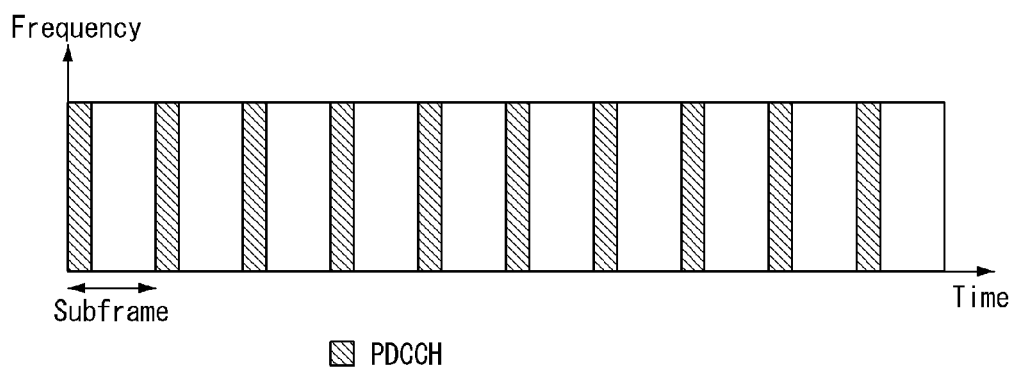
[FIG. 6]
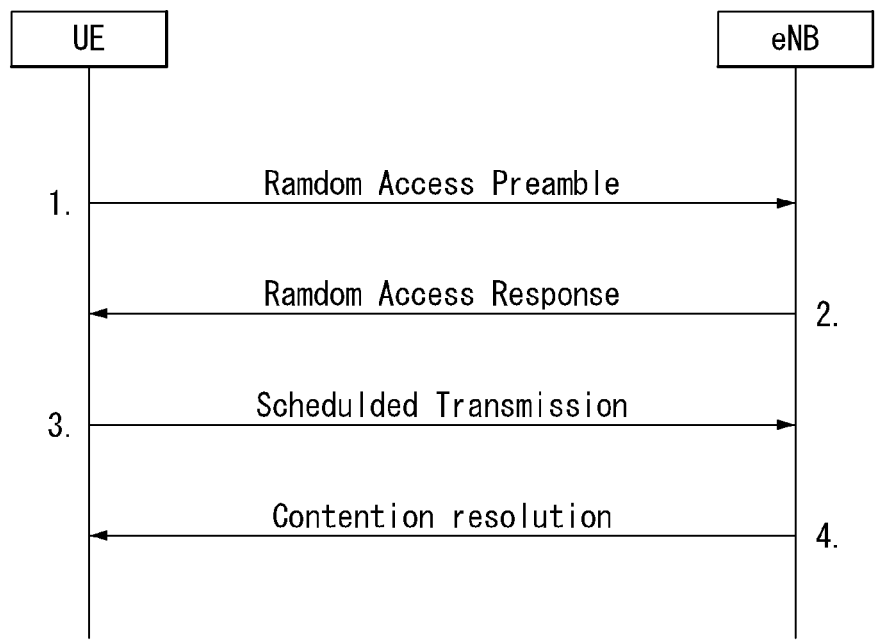

[FIG. 7]
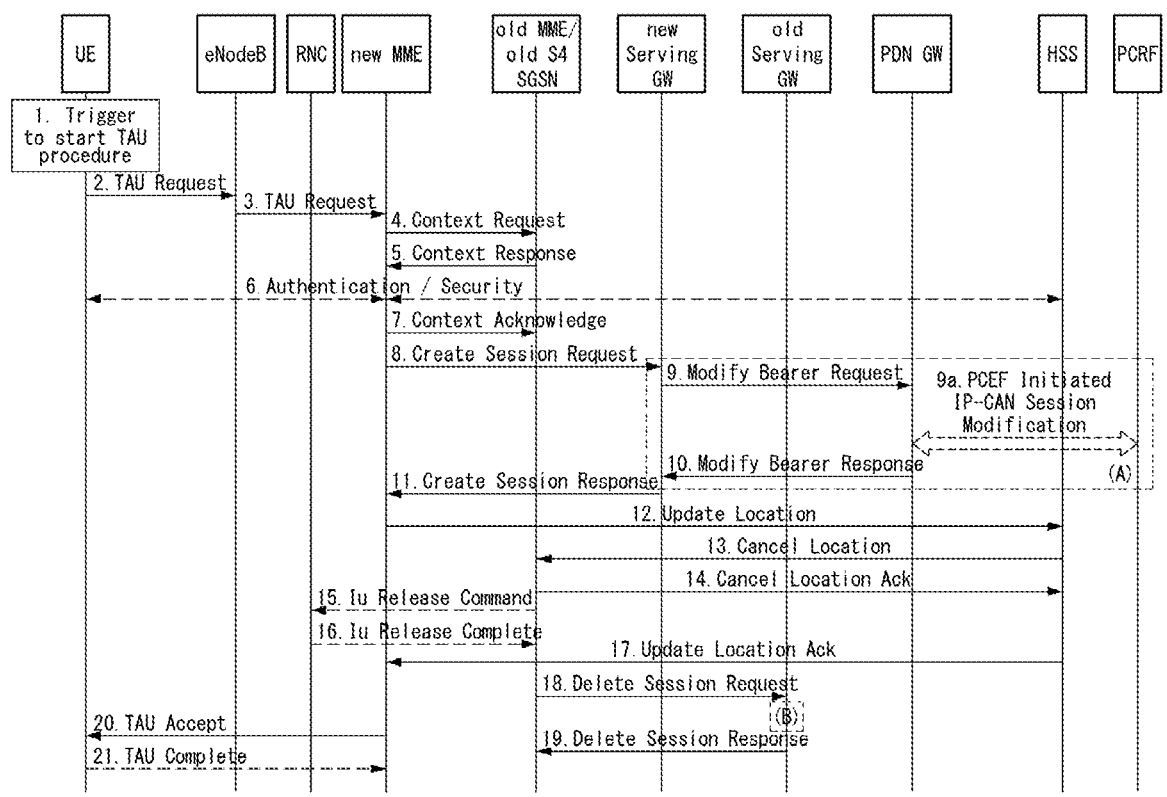

【FIG. 8】
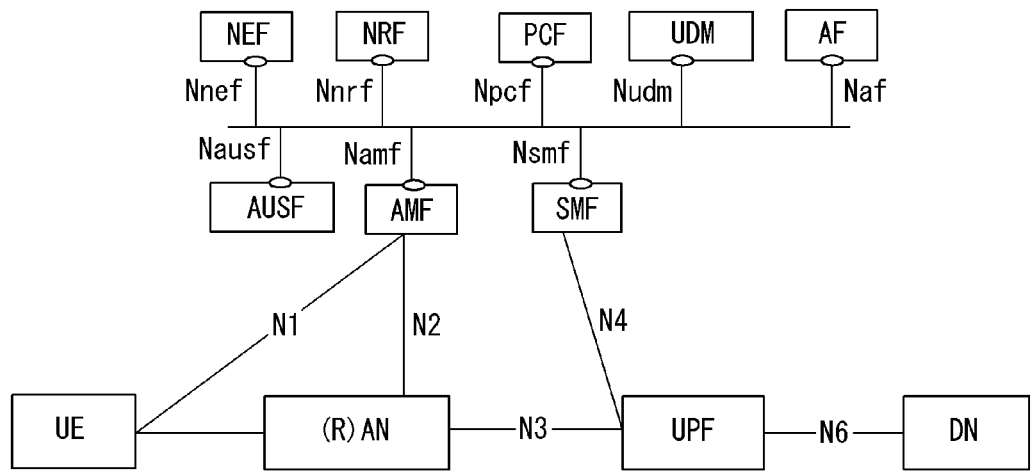
【FIG. 9】
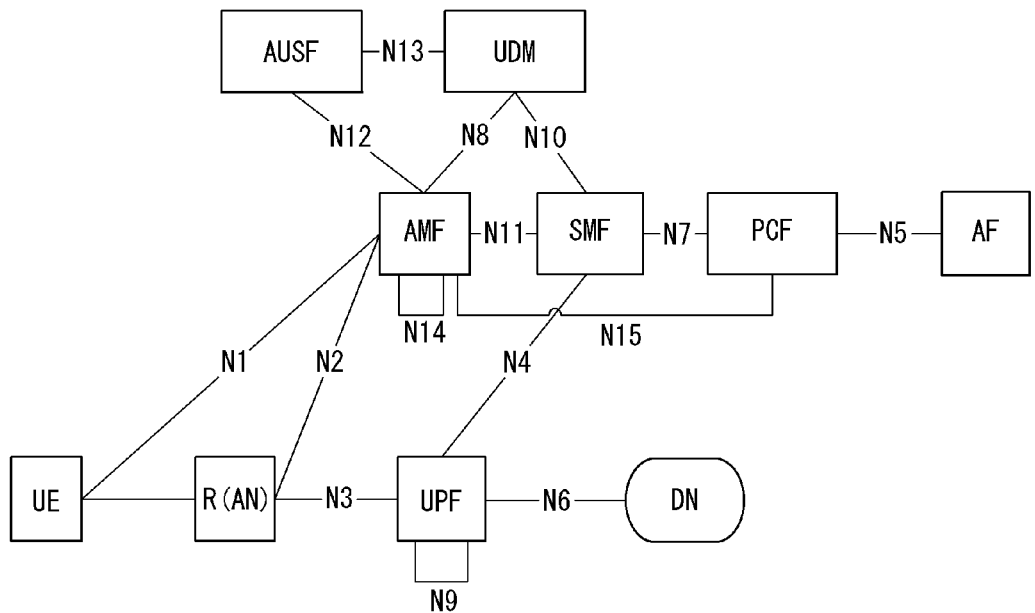

【FIG. 10】
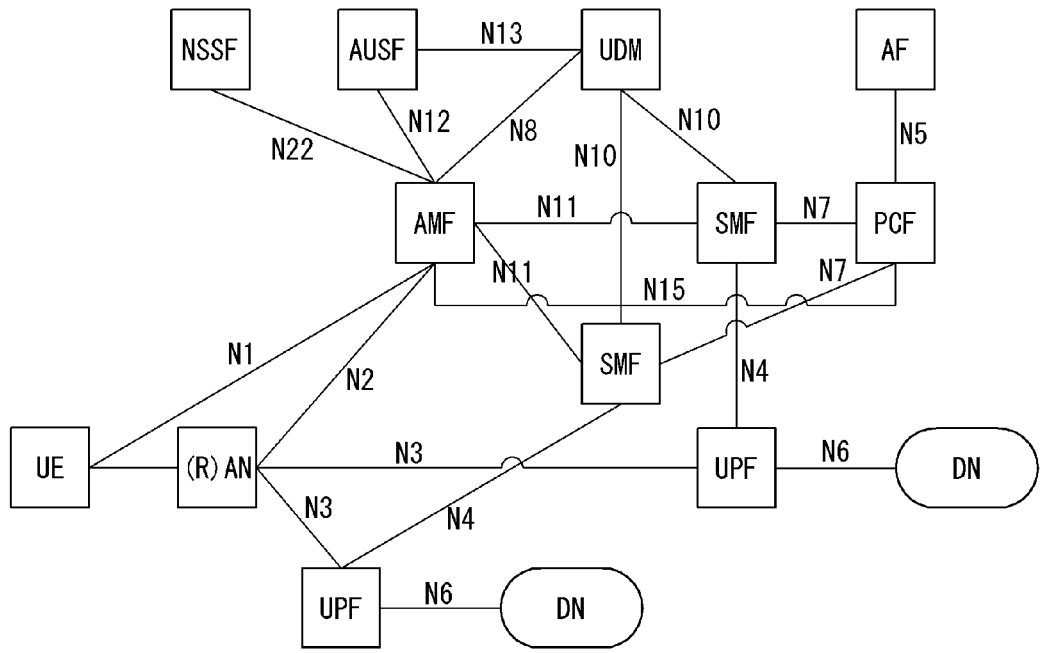
【FIG. 11】
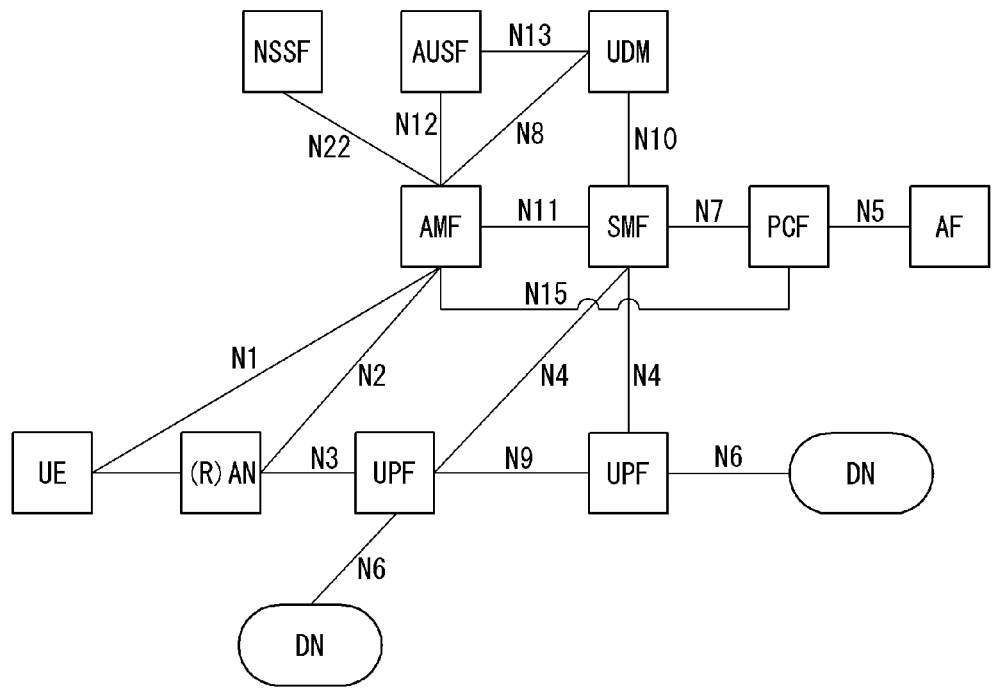

[FIG. 12]
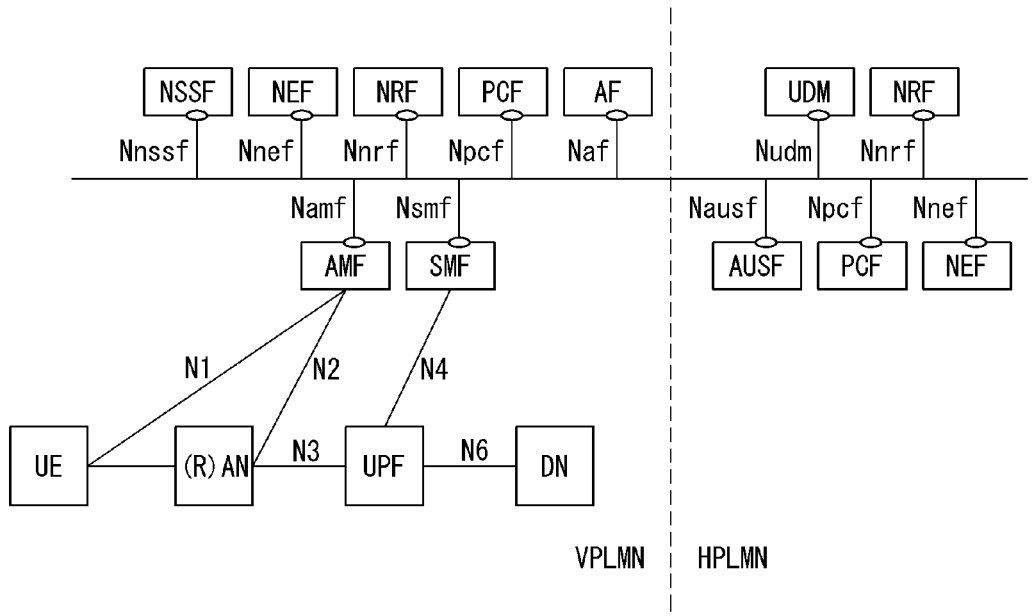
[FIG. 13]
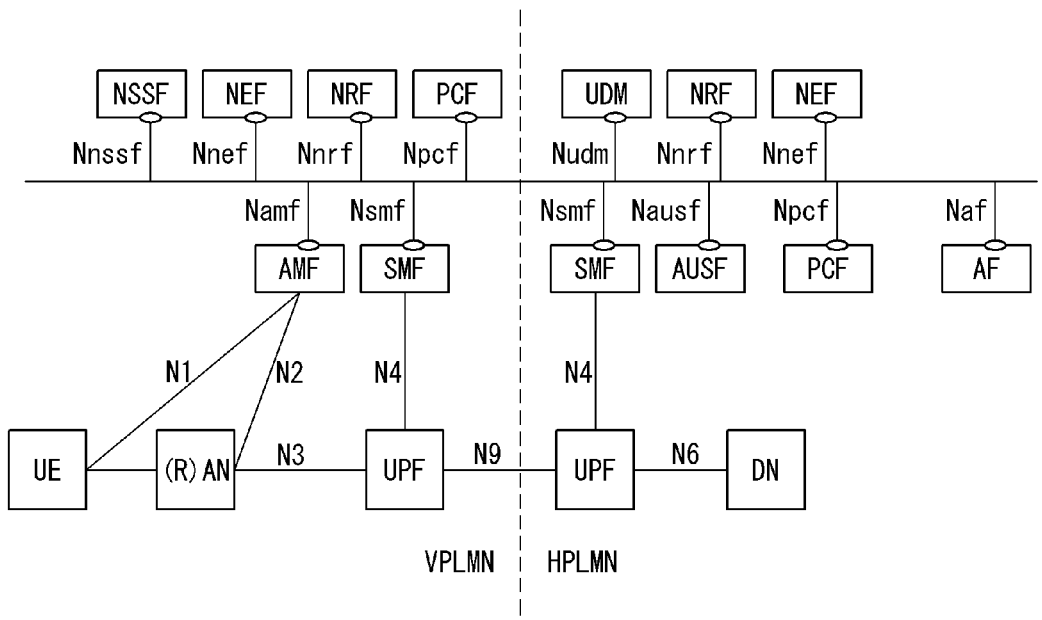

[FIG. 14]
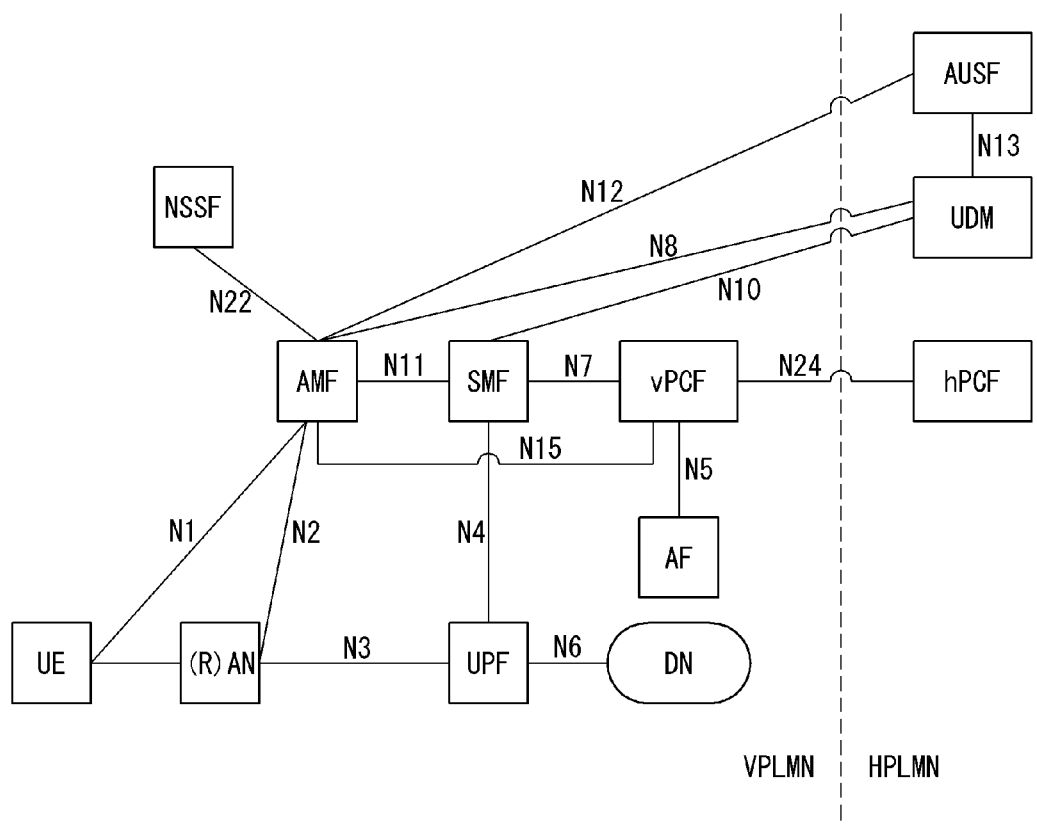

【FIG. 15】
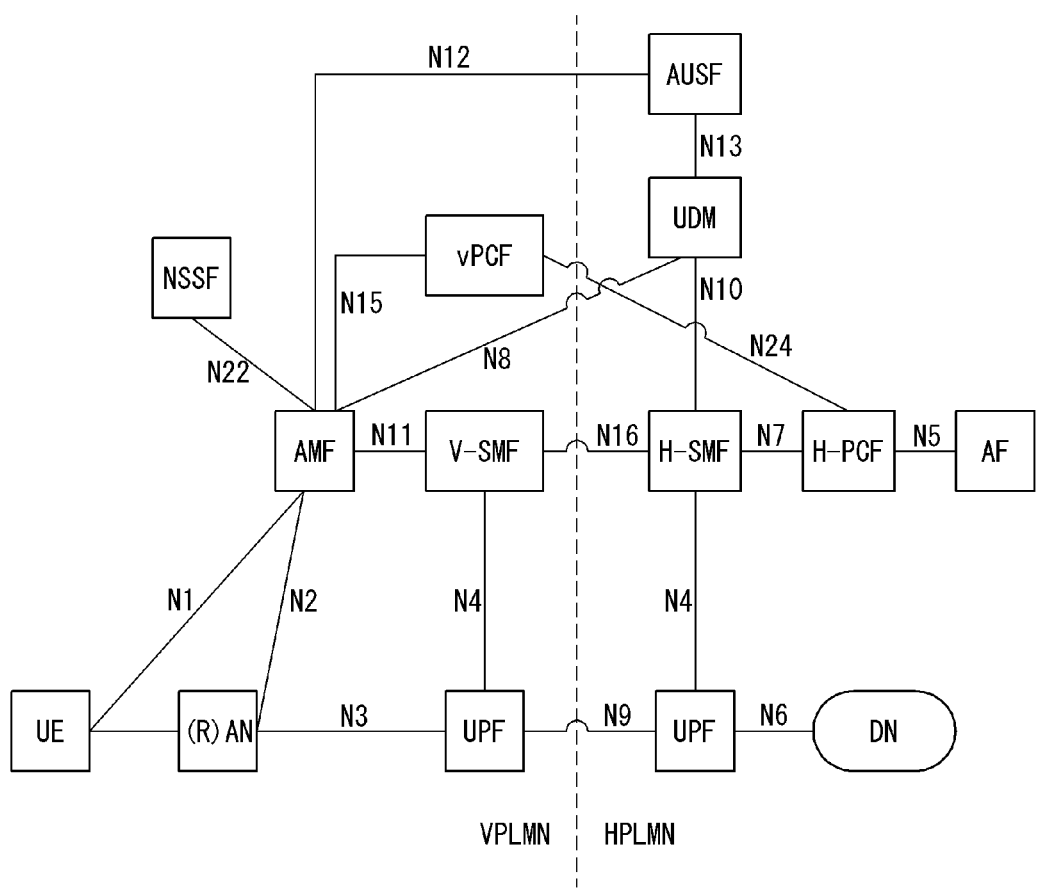

[FIG. 16]
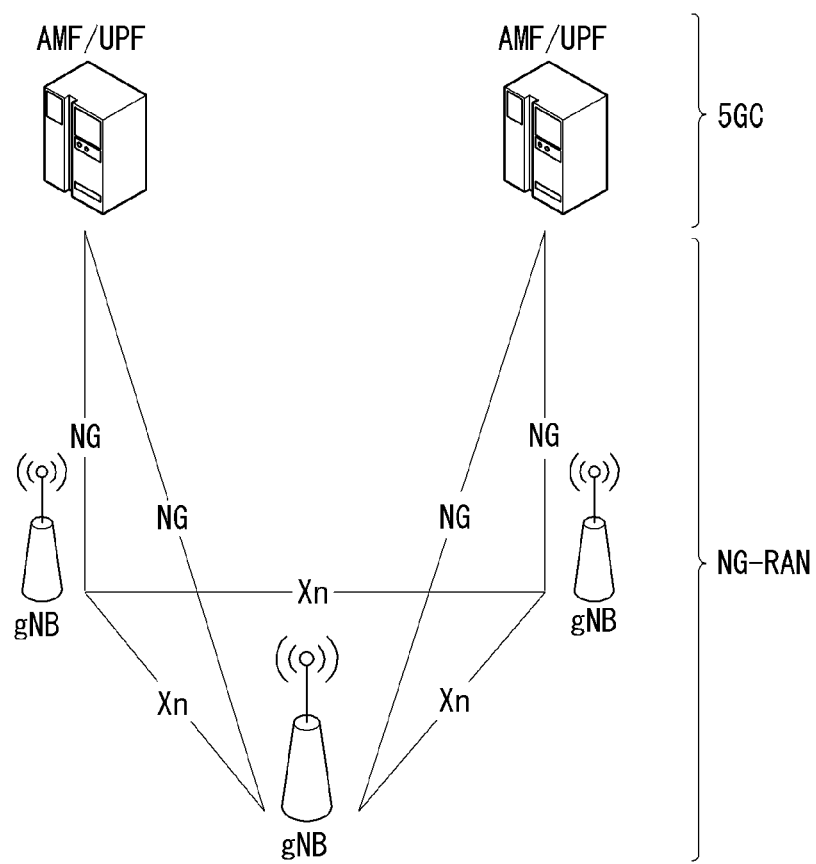

[FIG. 17]
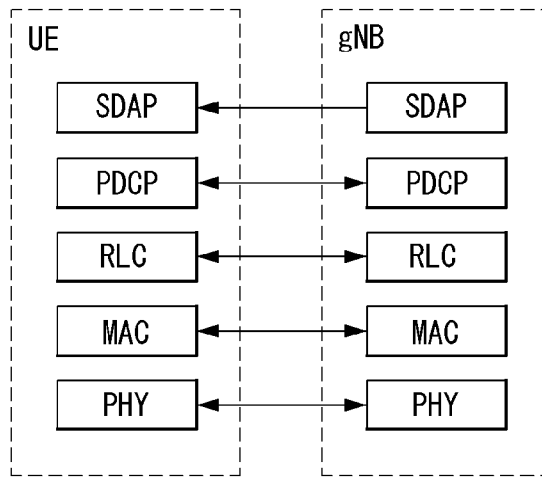
(a)
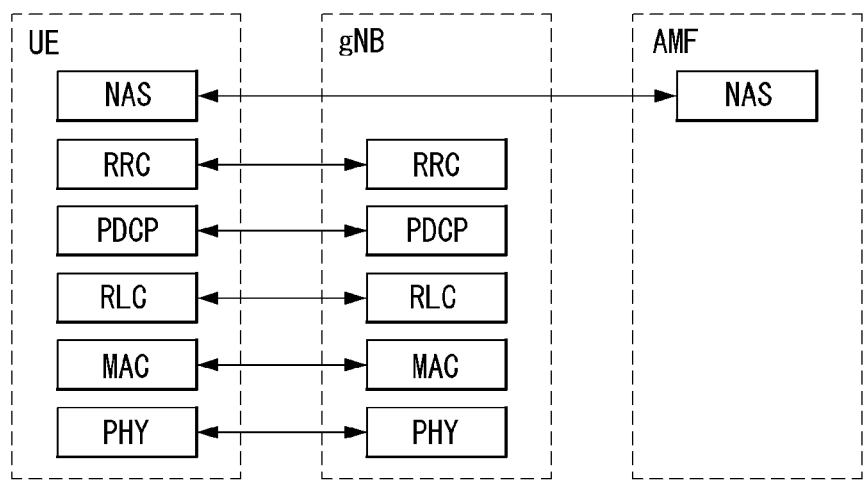
(b)

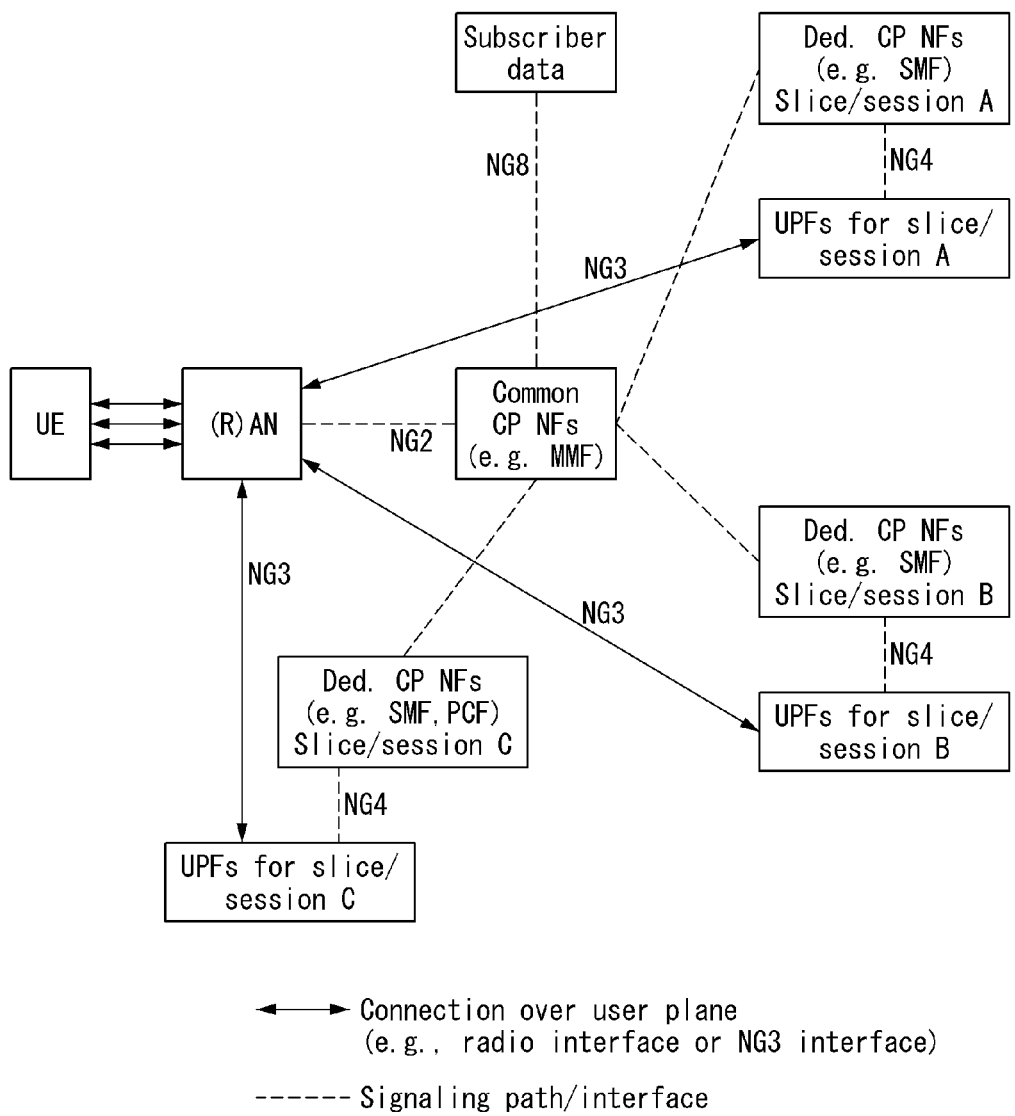
[FIG. 18]

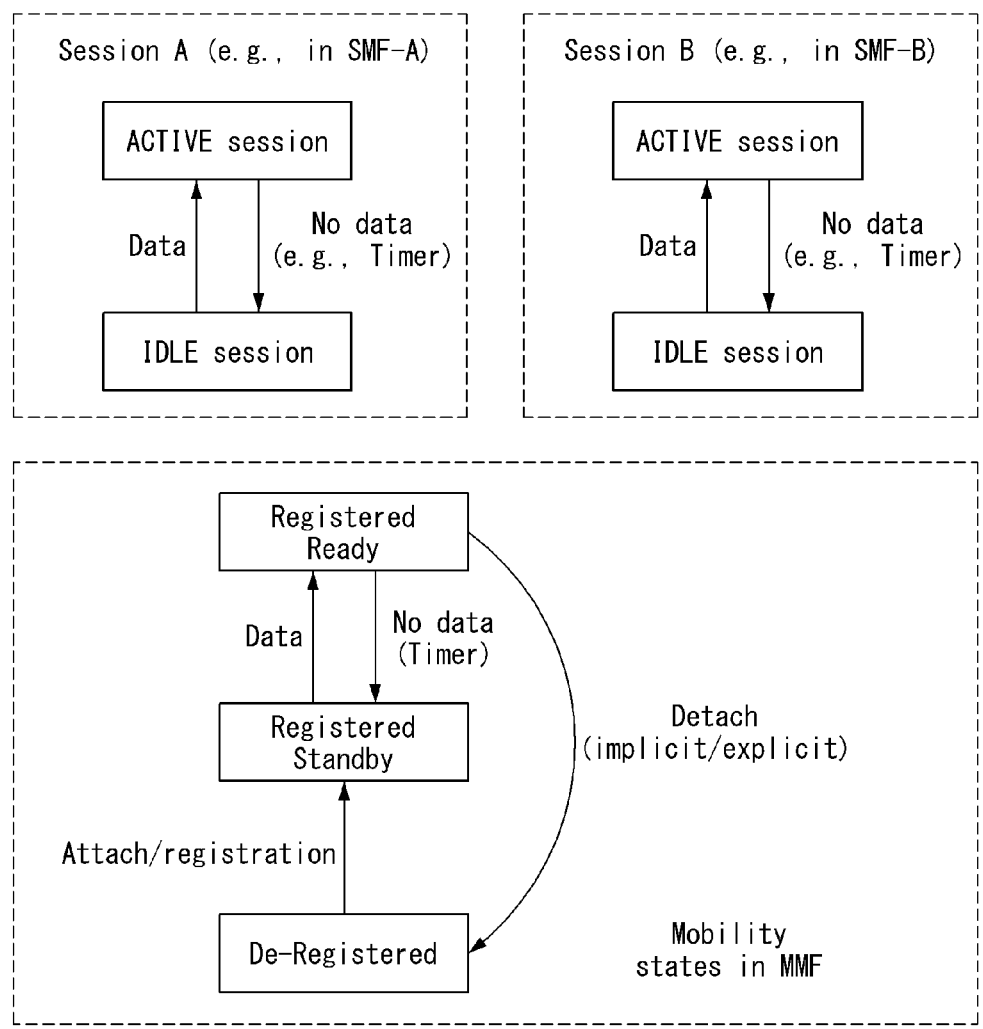
[FIG. 19]

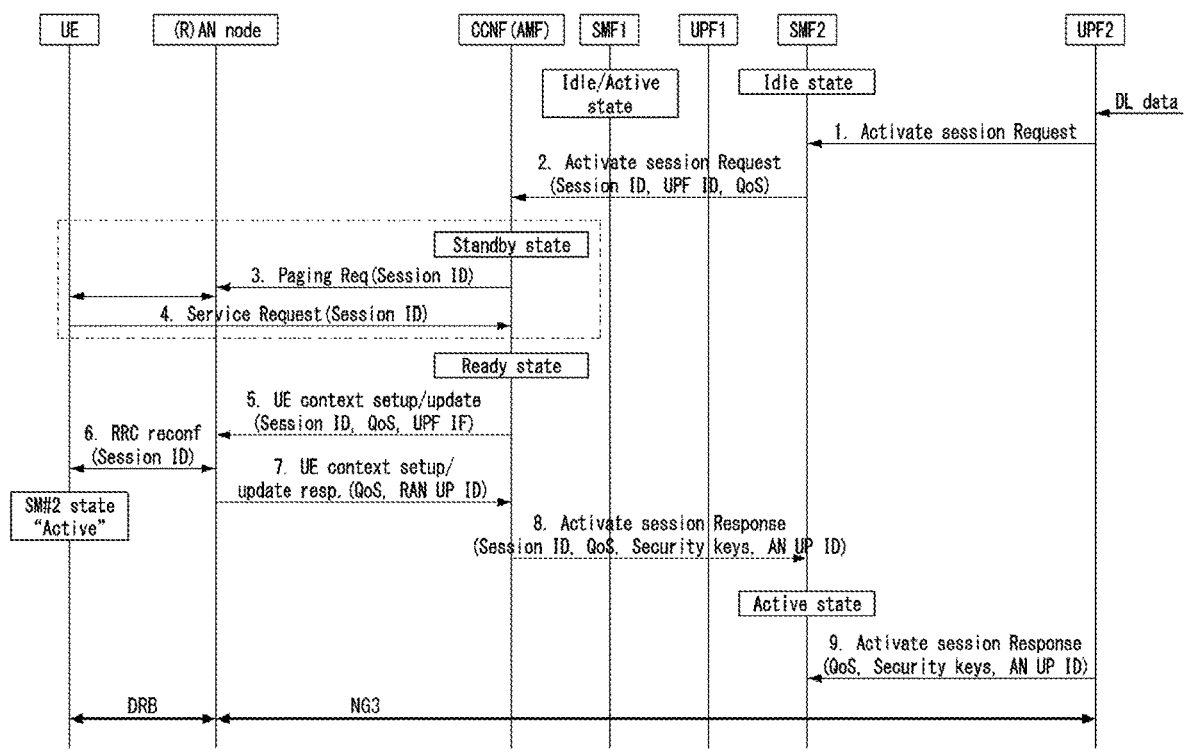
[FIG. 20]

[FIG. 21]
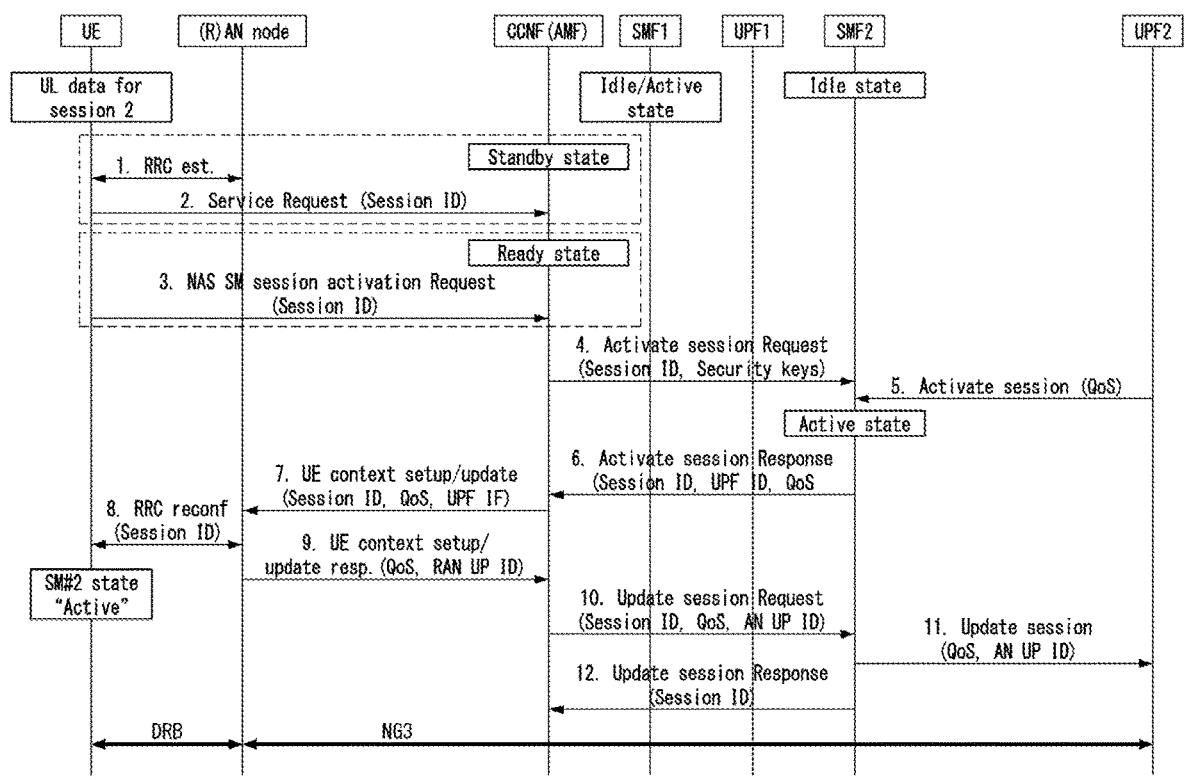

[FIG. 22]
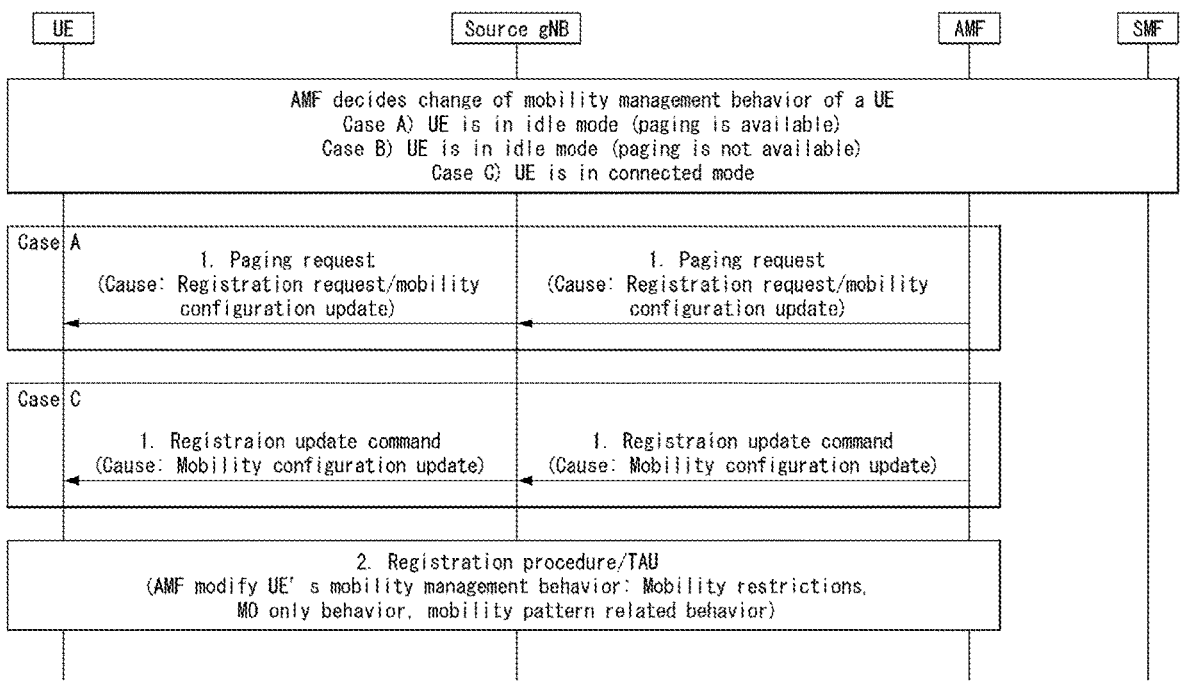

[FIG. 23]
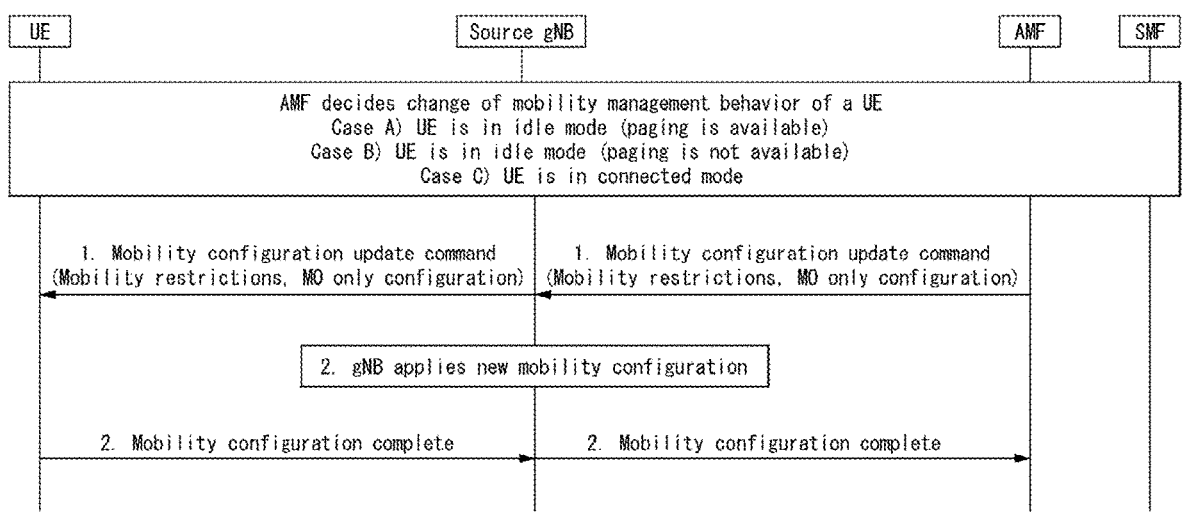

【FIG. 24】
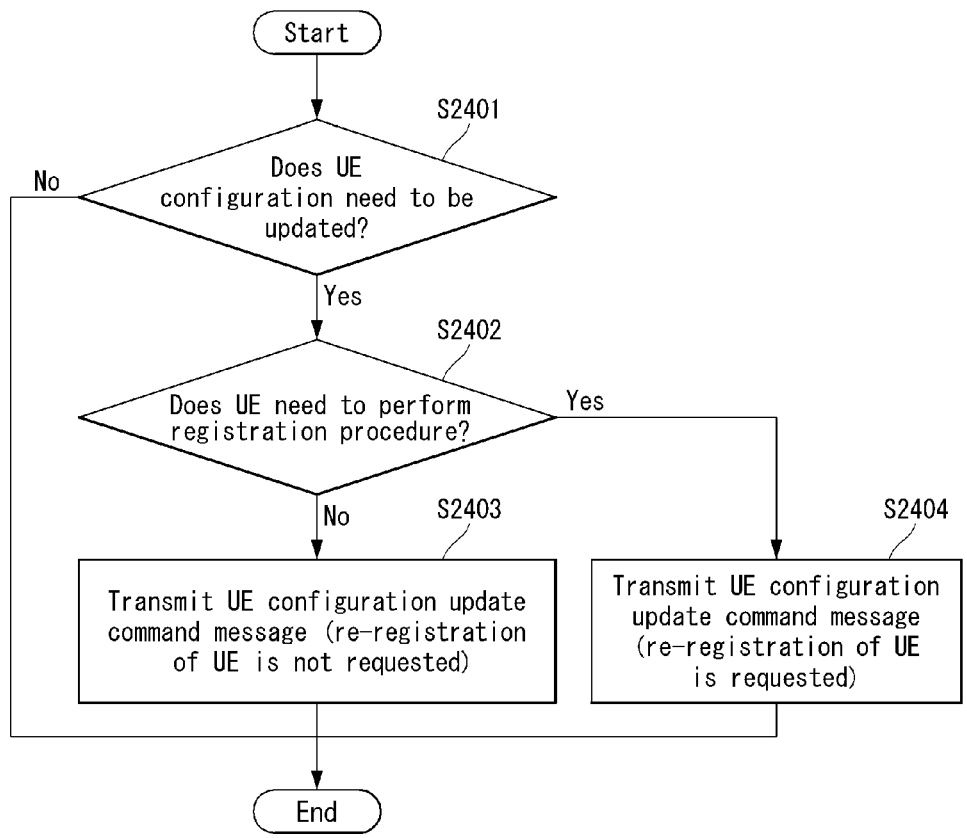

[FIG. 25]
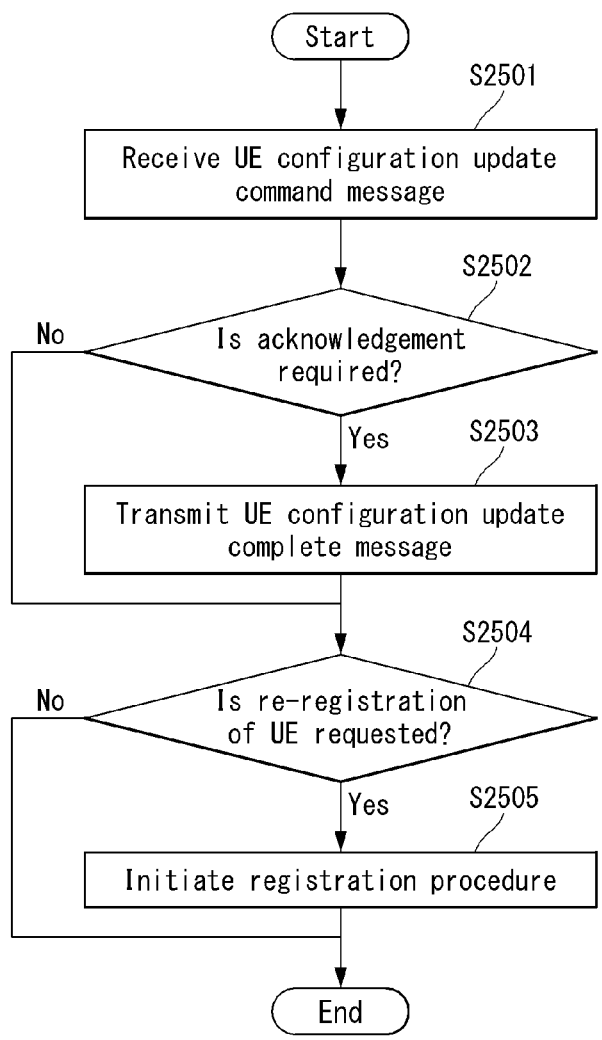

【FIG. 26】
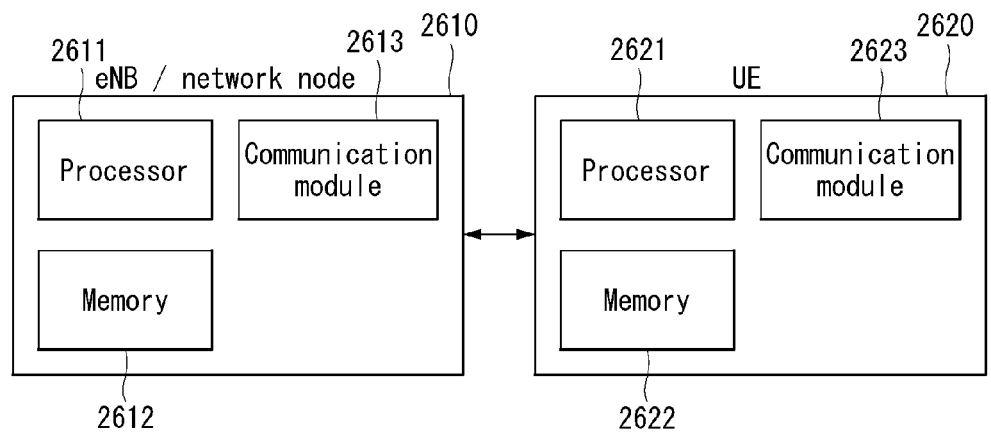
【FIG. 27】
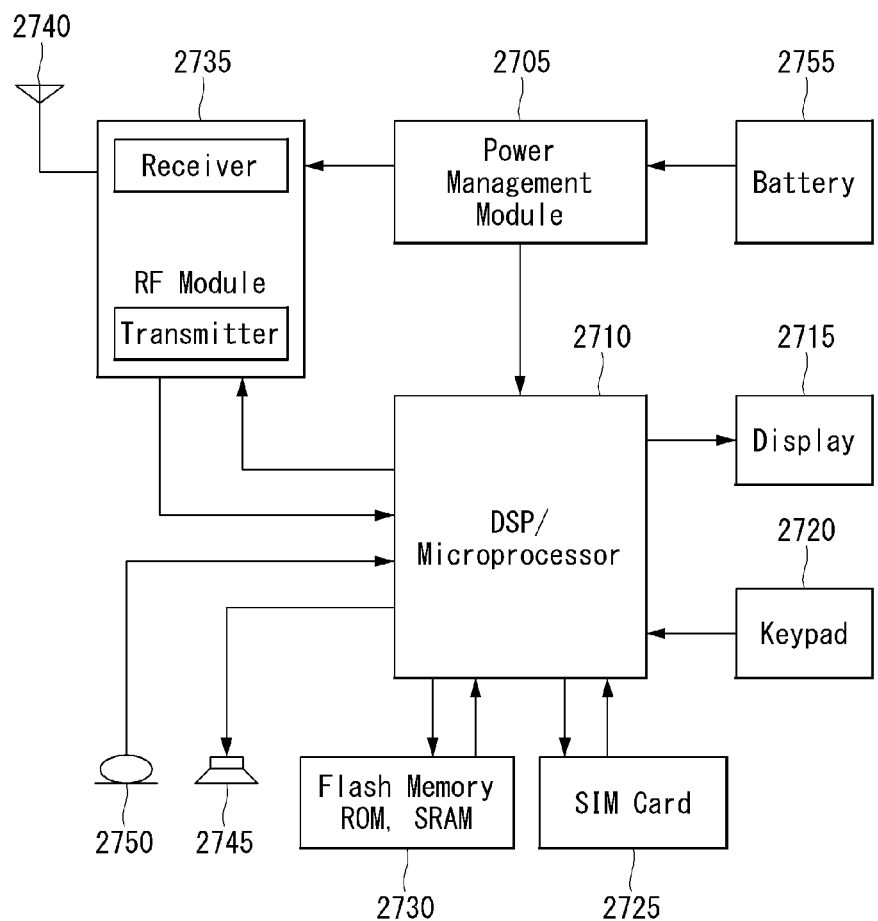

METHOD FOR UPDATING UE CONFIGURATION IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2018/000737, filed on Jan. 16, 2018, which claims the benefit of U.S. Provisional Application No. 62/446,786, filed on Jan. 16, 2017, 62/459,619, filed on Feb. 16, 2017, 62/492,967, filed on May 2, 2017, 62/501,110, filed on May 4, 2017 and 62/543,990, filed on Aug. 11, 2017, the contents of which are all hereby incorporated by reference herein in their entirety.

TECHNICAL FIELD

The present invention relates to a wireless communication system and, more specifically, to a method for updating UE configuration and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method for updating UE configuration (e.g., access and mobility related parameters, UE policy, and the like).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for updating a configuration of user equipment (UE) by an access and mobility management function (AMF) in a wireless communication system includes: determining whether the configuration of the UE needs to be changed without a request of the UE; and transmitting a UE configuration update command message to the UE when the configuration of the UE needs to be changed, wherein the UE configuration update command message includes an updated UE parameter.

Preferably, the method may further include determining whether the UE needs to perform a registration procedure, and re-registration of the UE may be requested by the UE configuration date command message when the UE needs to perform the registration procedure.

Preferably, re-registration of the UE may not be requested by the UE configuration date command message when negotiation between the UE and a network is not required to change the configuration of the UE.

Preferably, it may be determined that the UE needs to perform the registration procedure in order to update the configuration of the UE when negotiation between the UE and the network is required to change the configuration of the UE.

Preferably, the method may further include indicating a radio access network (RAN) to no longer enter an RRC inactive mode when the AMF provides RRC inactive assistance information to the RAN such that the RAN is able to use the RRC inactive mode.

Preferably, the method may further include transmitting paging to the UE to switch the UE to a CONNECTED mode when the UE is in an idle mode.

Preferably, the method may further include transmitting handover restricted information in which updated mobility restriction has been reflected to the RAN when the updated UE parameter includes the updated mobility restriction.

Preferably, the updated UE parameter may include one or more of mobility restriction, MICO (Mobile Initiated Connected Only), allowed network slice selection assistance information (NSSAI), temporary UE ID, a tracking area identity (TAI) list, or network identity and time zone information.

Preferably, the UE configuration update command message may include policy information of the UE when updated policy information of the UE is received from a policy control function (PCF).

Preferably, the policy information of the UE may include one or more of an access network discovery and selection policy, a session and service continuity (SSC) mode selection policy, a data network name (DNN) selection policy, or a non-seamless offload policy.

In another aspect of the present invention, a method for updating a configuration of user equipment (UE) in a wireless communication system includes: receiving, by the UE, a UE configuration update command message from an access and mobility management function (AMF) without a request of the UE, wherein the UE configuration update command message includes an updated UE parameter.

Preferably, the method may further include initiating a registration procedure when re-registration of the UE is requested by the UE configuration update command message.

Preferably, when the updated UE parameter includes MICO (Mobile Initiated Connected Only), the registration procedure may be initiated while the UE is in a CONNECTED mode.

Preferably, when the updated UE parameter does not include the MICO (Mobile Initiated Connected Only), the registration procedure may be initiated after the UE switches to an idle mode.

Preferably, the method may further include transmitting a UE configuration update complete message to the AMF when acknowledgement for the UE configuration update command message is requested.

Preferably, when the updated UE parameter includes only network identity and time zone information, acknowledgement for the UE configuration update command message may not be requested.

Preferably, the updated UE parameter may include one or more of mobility restriction, MICO (Mobile Initiated Connected Only), allowed network slice selection assistance information (NSSAI), temporary UE ID, a tracking area identity (TAI) list, or network identity and time zone information.

Advantageous Effects

According to embodiments of the present invention, a network can flexibly change a UE configuration at a time/situation at/in which the network desires.

According to embodiments of the present invention, a network can flexibly adjust operation per UE as differentiated UE mobility forms are introduced.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention is applicable.

FIG. 2 illustrates an example of evolved universal terrestrial radio access network structure to which the present invention is applicable.

FIG. 3 exemplifies a structure of E-UTRAN and EPC in a wireless communication system to which the present invention is applicable.

FIG. 4 illustrates a structure of a radio interface protocol between a UE and E-UTRAN in a wireless communication system to which the present invention is applicable.

FIG. 5 is a diagram schematically showing a structure of a physical channel in a wireless communication system to which the present invention is applicable.

FIG. 6 is a diagram for describing a contention based random access procedure in a wireless communication system to which the present invention is applicable.

FIG. 7 illustrates a tracking area update procedure in a wireless communication system to which the present invention is applicable.

FIGS. 8 to 15 illustrate wireless communication system architectures to which the present invention is applicable.

FIG. 16 illustrates an NG-RAN architecture to which the present invention is applicable.

FIG. 17 illustrates a wireless protocol stack in a wireless communication system to which the present invention is applicable.

FIG. 18 illustrates a reference architecture of a wireless communication system to which the present invention is applicable.

FIG. 19 illustrates session/mobility state machines in a wireless communication system to which the present invention is applicable.

FIGS. 20 and 21 illustrate session activation procedures in a wireless communication system to which the present invention is applicable.

FIGS. 22 to 25 illustrate a method for updating UE configuration according to an embodiment of the present invention.

FIG. 26 is a block diagram of a communication apparatus according to an embodiment of the present invention.

FIG. 27 is a block diagram of a communication apparatus according to an embodiment of the present invention.

BEST MODE

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.
Universal Mobile Telecommunication System (UMTS): the 3rd generation mobile communication technology based on GSM, developed by the 3GPP
Evolved Packet System (EPS): a network system comprising an Evolved Packet Core (EPC), a packet switched core network based on the Internet Protocol (IP) and an access network such as the LTE and UTRAN. The EPS is a network evolved from the UMTS.
NodeB: the base station of the UMTS network. NodeB is installed outside and provides coverage of a macro cell.
eNodeB: the base station of the EPS network. eNodeB is installed outside and provides coverage of a macro cell.
Home NodeB: the base station of a UMTS network. This is installed indoors and provides coverage of a micro cell.
Home eNodeB: the base station of an EPS network. This is installed indoors and provides coverage of a micro cell.
User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.
IP Multimedia Subsystem (IMS): a sub-system providing multimedia services based on the IP
International Mobile Subscriber Identity (IMSI): a globally unique subscriber identifier assigned in a mobile communication network
Mobility Management Entity (MME): A network node of EPS which executes functions such as mobility management and session management
Packet Data Network Gateway (PDN-GW): A network node of EPS which executes functions such as UE Internet protocol (IP) address allocation, packet screening and filtering, and charging data collection
Serving Gateway (GW): A network node of EPS which executes functions such as mobility anchoring, packet routing, idle mode packet buffering, and MME triggering to page a UE
Policy and Charging Rule Function (PCRF): A network node of EPS which performs policy decision for dynamically applying differentiated quality of service (QoS) and charging policy per service flow
Open Mobile Alliance Device Management (OMA DM): A protocol designed for management of mobile devices such as cellular phones, PDA and portable computers and executing functions such as device configuration, firmware upgrade and error report
Operation Administration and Maintenance (OAM): this refers to a network management function group which provides network defect indication, performance information and data and diagnosis functions.
NAS configuration MO (Management Object): this refers to a management object (MO) used to configure parameters associated with NAS functionality for a UE.
Packet Data Network (PDN): A network in which servers supporting specific services (e.g., MMS (Multimedia Messaging Service) server, WAP (wireless application protocol) server, etc.) are located
Access Point Name (APN): A character string for indicating or identifying a PDN. This is a name (character string) predefined in a network to detect a P-GW when a requested service or network (PDN) is accessed through the corresponding P-GW (for example, internet.mnc012.mcc345.gprs).
PDN connection: connection from a UE to a PDN, that is, association (connection) between a UE indicated by an IP address and a PDN indicated by an APN
Home Location Register (HLR)/Home Subscriber Server (HSS): a database provisioning subscriber information within the 3GPP network. An HSS can perform functions of configuration storage, identity management, user state storage, and so on.
Radio Access Network (RAN): a unit including a node B, a radio network controller (RNC) which controls the node B, and an eNodeB in a 3GPP network. This exists at a UE side and provides connection to a core network.
Public Land Mobile Network (PLMN): a network formed to provide mobile communication services to individuals. The PLMN can be formed separately for each operator.
Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.
Access Stratum (AS): this includes a protocol stack between a UE and a wireless (or access) network and takes charge of data and network control signal transmission.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE ACTIVE state. As described above, the gateway in EPC may perform functions of paging origination, LTE IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Tracking Area Update/Updating (TAU) Procedure

A TAU procedure is one of mobility management procedures performed in MME and is an important function of managing UE mobility in EPS.

Mobility based TAU may be performed when entry into a new tracking area (TA) which is not present in a list of tracking area identities (TAI) is detected (i.e., when a tracking area is changed).

In addition, when a UE enters an idle mode and then a periodic TAU (P-TAU) timer set in the UE expires, a periodic TAU procedure may be performed. The periodic TAU may be regarded as a method for reachability check for checking whether a UE is present in a valid manner in a network thereof in the network.

When a UE performs an attach procedure for attaching to a system and a tracking area changes due to mobility of the UE or a TAU procedure is periodically performed, configuration related to UE mobility (e.g., extended idle-mode discontinuous reception (eDRX)) or a power saving mode (PSM)) is set and operated for the UE by MME at the request of the UE during the procedure.

TAU triggering conditions of a UE which will be described later include change of eDRX and PSM, and a network sets availability and appropriate values of eDRX and PSM for the UE only when the UE initiates a TAU procedure and requests the eDRX and PSM.

A stand-alone TAU occurs when a GPRS-attached or E-UTRAN-attached UE experiences any of the following conditions:

The UE detects that it has entered a new TA that is not in the list of TAIs that the UE registered with the network (except for the case of a UE configured to perform Attach with IMSI when entering a TA in a new non-equivalent PLMN in RRC-IDLE mode);

the periodic TA update timer has expired;

The UE was in UTRAN PMM_Connected state (e.g. URA_PCH) when the UE reselects to E-UTRAN;

The UE was in GPRS READY state when the UE reselects to E-UTRAN;

the temporary identity (TIN) indicates "P-TMSI" when the UE reselects to E-UTRAN (e.g. due to bearer configuration modifications performed on GERAN/UTRAN);

the RRC connection was released with release cause "load re-balancing TAU required";

the RRC layer in the UE informs the UE's NAS layer that an RRC connection failure (in either E-UTRAN or UTRAN) has occurred;

a change of the UE network capability and/or MS network capability and/or UE specific DRX parameters and/or MS radio access capability (e.g., due to GERAN radio capability change or CDMA 2000 radio access technology capability change) information of the UE.

a change in conditions in the UE require a change in the eDRX parameters previously provided by the MME.

for a UE supporting CS fallback, or configured to support IMS voice, or both, a change of the UE's usage setting or voice domain preference for E-UTRAN.

for a SR-VCC capable UE, a change of MS Classmark 2, MS Classmark 3 and/or Supported Codecs.

The UE manually selects a CSG cell whose CSG ID and associated PLMN is absent from both the UE's allowed CSG list and the UE's operator CSG list.

The UE receives a paging request from the MME while the mobility management back off timer is running and the UE's TIN indicates "P-TMSI".

a change in any of the values of information included in preferred network behavior that would create incompatibility with the supported network behavior provided by the serving MME.

The procedure is initiated by an UE in either ECM-IDLE state or ECM-CONNECTED state. The decision to perform S-GW change during the tracking area update procedure is made by the MME independently from the triggers above.

If selected Internet protocol (IP) traffic offload (SIPTO) is allowed for the APN associated with a PDN connection, the MME should re-evaluate whether the PGW location is still acceptable. If the MME determines that PGW re-location is needed, the MME may initiate PDN deactivation with reactivation requested at the end of the tracking area/routing area update procedure.

If SIPTO at the local network is allowed for the APN associated with a PDN connection, the MME handles the SIPTO at the local network PDN connection as follows.

For a local gateway (L-GW) collocated with (H)eNB:

For intra-MME mobility, upon completion of the TAU procedure, the MME deactivates the SIPTO at the local network PDN connection with the "reactivation requested" cause value. If the UE has no other PDN connection, the MME initiates "explicit detach with reattach required" procedure.

For inter-MME/SGSN mobility

As part of the TAU procedure, the source MME removes the bearer(s) corresponding to the SIPTO at local network PDN connection and releases the core network resources associated to the SIPTO at the Local network PDN connection by performing the MME-initiated PDN connection deactivation before sending the context response message.

For a stand-alone GW:

For intra-MME mobility, upon completion of the TAU procedure, the MME checks that the local home network ID has changed and decides whether to deactivate the SIPTO at the local network PDN connection with the "reactivation requested" cause value. If the UE has no other PDN connection, the MME initiates "explicit detach with reattach required" procedure.

For Inter-MME/SGSN mobility, upon completion of the TAU/RAU procedure, the new MME/SGSN checks that the local home network ID has changed and decides whether to deactivate the SIPTO at the local network PDN connection with the "reactivation requested" cause value. If the UE has no other PDN connection, the MME initiates "explicit detach with reattach required" procedure.

If local Internet protocol (IP) access (LIPA) is active for a PDN connection of the UE, the source MME (or S4-SGSN) does not include LIPA bearer(s) in the EPS bearer context during TAU procedure and releases the core network resources of this LIPA PDN connection by performing the MME requested PDN disconnection procedure before the source MME responds with the context response message in the case of inter-MME/SGSN mobility or after the source MME receives TAU request in the case of intra-MME mobility.

During the TAU procedure, if the MME supports SRVCC and if the UE SRVCC capability has changed, the MME informs the HSS with the UE SRVCC capability (for further IMS registration).

During the TAU procedure, if the MME detects that the serving GW or/and the MME needs be relocated, the old MME may reject any PDN GW initiated EPS bearer(s) request received since the TAU procedure started and if rejected, the old MME includes an indication that the request has been temporarily rejected due to mobility procedure in progress. The rejection is forwarded by the serving GW to the PDN GW, with the indication that the request has been temporarily rejected.

Upon reception of a rejection for an EPS bearer(s) PDN GW initiated procedure with an indication that the request has been temporarily rejected due to mobility procedure in progress, the PDN GW start a locally configured guard timer. The PDN GW re-attempts, up to a pre-configured number of times, when either the PDN GW detects that the TAU procedure is completed or has failed using message reception or at expiry of the guard timer.

The eNB includes the TAFECGI (E-UTRAN Cell Global Identifier) of the current cell in every S1-AP UPLINK NAS TRANSPORT message.

An eNodeB can contain cells from more than one TA and intra-eNodeB cell changes are not normally notified to the MME. However, the MME needs to know the UE's current TAI in order to correctly produce a TAU accept message.

FIG. 7 illustrates a TAU procedure in a wireless communication system to which the present invention is applicable.

FIG. 7 illustrates a TAU procedure involving S-GW change.

1. One of the above-described triggers for starting the TAU procedure occurs.

2. A UE initiates the TAU procedure by sending, to an eNB, a TAU request message together with RRC parameters indicating a selected Network and the old globally unique MME identifier (GUMMEI).

The TAU request message may include UE core network capability, mobile station (MS) network capability, preferred network behavior, old globally unique temporary identify (GUTI), Old GUTI type, last visited TAI, active flag, EPS bearer status, Packet temporary mobile subscriber identity (P-TMSI) signature, additional GUTI, key set identifier for E-UTRAN (eKSI), NAS sequence number, NAS message authentication code (NAS-MAC), key set identifier (KSI), and voice domain preference and UE's usage setting.

The active flag is a request by a UE to activate the radio and S1 bearers for all the active EPS bearers by the TAU procedure when the UE is in an ECM-IDLE state. The EPS bearer status indicates each EPS bearer that is active in the UE.

For a UE using CIoT EPS optimization without any activated PDN connection, there is no active flag or EPS bearer status included in the TAU Request message.

3. The eNodeB derives the MME address from the RRC parameters carrying the old GUMMEI, the indicated selected network and the RAT. Further, the MME address may be derived on the basis of RRC CIoT EPS optimization information.

The eNB forwards the TAU request message together with the CSG access mode, CSG ID, TAFECGI of the cell from which the eNB received the message and with the selected network to the new MME.

4. The new MME differentiates the type of the old node (i.e., MME or SGSN) and uses the GUTI received from the UE to derive the old MME/S4 SGSN address. In addition, the new MME sends a context request message to the old MME/old S4 SGSN to retrieve user information.

The context request message may include old GUTI, complete TAU request message, P-TMSI signature, MME address, UE validated, and CIoT EPS optimization support indication.

If the new MME supports CIoT EPS optimization, CIoT EPS optimization support indication is included in the context request message indicating support for various CIoT EPS optimizations (e.g., support for header compression for CP optimization, etc.).

5. If the context request is sent to an old MME, the old MME responds with a context response message.

The context response message may include IMSI, mobile equipment (ME) identity (IMEISV (International Mobile Station Equipment Identity and Software Version Number)), mobility management (MM) context, EPS bearer context(s), serving GW signaling address and TEID(s), idle mode signaling reduction (ISR) supported, MS information change reporting action (if available), CSG information reporting action (if available), UE time zone, UE core network capability, and UE specific DRX parameters.

If the new MME supports CIoT EPS optimization and robust header compression (RoHC) for the UE is present, the context response message also includes header compression configuration.

For a UE using CIoT EPS optimization without any activated PDN connection, there is no EPS bearer context(s) included in the context response message.

Based on the CIoT EPS optimization support indication, the old MME only transfers the EPS bearer context(s) that the new MME supports. If the new MME does not support CIoT EPS optimization, EPS bearer context(s) of non-IP PDN connection are not transferred to the new MME. If the EPS bearer context(s) of a PDN connection has not been transferred, the old MME considers all bearers of that PDN connection as failed and releases that PDN connection by triggering the MME requested PDN disconnection procedure. The buffered data in the old MME is discarded after receipt of a context acknowledgement message.

6. If the integrity check of TAU request message sent in step 2 failed, then authentication is mandatory.

7. The MME (if the MME has changed then it is the new MME) determines to relocate the serving GW. The serving GW is relocated when the old serving GW cannot continue to serve the UE. The MME (if the MME has changed then it is the new MME) may also decide to relocate the serving GW if a new serving GW is expected to serve the UE longer and/or with a more optimal UE to PDN GW path, or if a new serving GW can be co-located with the PDN GW.

If the MME has changed, the new MME sends a context acknowledge message to the old MME/old S4 SGSN.

The context acknowledge message includes S-GW change indication.

For a UE using CIoT EPS optimization without any activated PDN connection, the steps 8, 9, 10, 11, 18 and 19 are skipped.

8. If the MME has changed, the new MME verifies the EPS bearer status received from the UE with the bearer contexts received from the old MME/old S4 SGSN. If the MME has not changed, the MME verifies EPS bearer status from the UE with the bearer contexts available in the MM context.

The MME releases any network resources related to EPS bearer(s) that are not active in the UE. If there is no bearer context at all, the MME rejects the TAU request.

If the MME selected a new serving GW, the MME sends a Create Session Request message per PDN connection to the selected new serving GW.

The Create Session Request message may include IMSI, bearer contexts, MME address and TEID, Type, protocol type over S5/S8, RAT type, serving network, and UE time zone.

If the new MME receives the EPS bearer context with SCEF, then the new MME updates the SCEF.

9. The S-GW sends a Modify Bearer Request message per PDN connection to the P-GW(s) concerned.

The Modify Bearer Request message may include S-GW address and TEID, RAT type, serving network, PDN charging pause support indication.

9a. If dynamic policy and charging control (PCC) is deployed and RAT type information needs to be conveyed from the P-GW to the policy and charging rules function (PCRF), then the P-GW sends RAT type information to the PCRF by means of an IP connectivity access network (IP-CAN) session modification procedure.

10. The P-GW updates bearer contexts thereof and returns a Modify Bearer Response message to the S-GW.

The Modify Bearer Response message may include MSISDN, charging ID, PDN charging pause enabled indication (if the P-GW has chosen to enable this function).

11. The S-GW updates the bearer context thereof. This allows the S-GW to route bearer PDUs to the P-GW when received from eNB.

The S-GW returns a Create Session Response message to the MME.

The Create Session Response message may include S-GW address and TEID for user plane and control plane, P-GW TEIDs (for GTP (GPRS Tunneling Protocol)-based S5/S8) or GRE keys (for PMIP (Proxy Mobile IP)-based S5/S8) for uplink traffic and control plane, MS Info Change Reporting Action message.

12. The new MME verifies whether the new MME holds subscription data for the UE identified by the GUTI, the additional GUTI or by the IMSI received with the context data from the old CN node.

If there are no subscription data in the new MME for this UE, then the new MME sends an Update Location Request message to the HSS.

The Update Location Request message may include MME identity, IMSI, ULR-flags (Update Location Request flags), MME capabilities, homogeneous support of IMS voice over packet switched sessions, UE SRVCC (Single Radio Voice Call Continuity) capability, equivalent PLMN list, and ME identity (IMEISV).

13. The HSS sends a Cancel Location message with cancellation type set to update procedure to the old MME.

The Cancel Location message may include IMSI and cancellation type.

14. If the timer started in step 4 is not running, the old MME removes the MM context. Otherwise, the contexts are removed when the timer expires.

The old MME acknowledges with a Cancel Location Ack message including IMSI.

15. When old S4 SGSN receives the Context Acknowledge message and if the UE is in Iu Connected, the old S4 SGSN sends an Iu Release Command message to the RNC after the timer started in step 4 has expired.

16. The RNC responds with an Iu Release Complete message.

17. The HSS acknowledges the Update Location Request message by sending an Update Location Ack message to the new MME.

18. If the MME has changed, when the timer started in step 4 expires, the old MME/old S4 SGSN releases any local MME or SGSN bearer resources. Additionally, the old MME/old S4 SGSN deletes the EPS bearer resources by sending a Delete Session Request message including cause and operation indication to the old S-GW if the old MME/old S4 SGSN received the S-GW change indication in the Context Acknowledge message in step 7.

If the MME has not changed, step 11 triggers the release of the EPS bearer resources at the old S-GW.

19. The S-GW acknowledges with a Delete Session Response message including cause.

The S-GW discards any packets buffered for the UE.

20. The MME sends a TAU Accept message to the UE.

The TAU Accept message may include GUTI, TAI list, EPS bearer status, NAS sequence number, NAS-MAC, IMS voice over PS session supported, emergency service support indicator, LCS (Location Service) support indication, and supported network behavior.

If the active flag is set, the MME may provide the eNB with a handover restriction list. If the MME allocates a new GUTI, the GUTI is included in the TAU Accept message. If the active flag is set in the TAU request message, a user plane setup procedure is activated in conjunction with the TAU Accept message. If the DL data buffer expiration time for the UE in the MME expires, the user plane setup procedure is activated even if the MME did not receive the active flag in the TAU request message. If the new MME receives a Downlink Data Notification message or any downlink signaling message while the UE is still connected, the user plane setup procedure is activated even if the new MME did not receive the active flag in the TAU request message.

For a UE using CIoT EPS optimization without any activated PDN connection, there is no EPS bearer status included in the TAU Accept message.

21. If GUTI was included in the TAU Accept, the UE acknowledges the received message by returning a TAU Complete message to the MME.

When the active flag is not set in the TAU request message and the TAU was not initiated in ECM-CONNECTED state, the new MME releases the signaling connection with UE according to S1 release procedure.

The new MME may initiate E-RAB establishment after execution of the security functions, or wait until completion of the TAU procedure. For the UE, E-RAB establishment may occur anytime after the TA update request is sent.

The terms used in the present description are defined as follows.

5G system (5GS): A system composed of a 5G access network (AN), a 5G core network and user equipment (UE).

5G access network (5G-AN) (or AN): An access network composed of a new generation radio access network (NG-RAN) connected to a 5G core network and/or a non-3GPP access network (AN)

New generation radio access network (NG-RAN) or RAN): A radio access network having common characteristics of connection to 5GC and supporting one or more of the following options.

1) Standalone new radio
2) New radio which is an anchor supporting E-UTRAN extension
3) Standalone E-UTRAN (e.g., eNodeB)
4) Anchor supporting new radio extension 5G core network: A core network connected to a 5G access network Network function (NF): refers to a processing function adopted in 3GPP in a network or defined in 3GPP. This processing function includes a defined functional behavior and an interface defined in 3GPP.

NF service: A function exposed by an NF through a service-based interface and consumed by other authenticated NFs Network slice: A logical network providing specific network capabilities and network characteristics Network slice instance: A set of NF instances forming deployed network slice and required resources (e.g., computing, storage and networking resources)

Protocol data unit (PDU) connectivity service: A service providing exchange of PDUs between a UE and a data network PDU connectivity service: A service providing exchange of PDUs between a UE and a data network PDU session: Association between a UE providing PDU connectivity service and a data network. Association type may be IP (Internet Protocol), Ethernet or unstructured.

5G System Architecture to which the Present Invention is Applicable 5G system is a technology evolving from 4G LTE mobile communication technology and is extended from new radio access technology (RAT) and LTE (Long Term Evolution) through evolution of conventional mobile communication network architecture or clean-state architecture. The 5G system supports eLTE (extended LTE), non-3GPP (e.g., Wireless Local Area Network (WLAN)) access, and the like.

5G system architecture is defined to support data connection and service such that deployment can use technologies such as network function virtualization and software defined networking. The 5G system architecture utilizes service-based interaction between control plane (CP) and network function (NF). Several major principles and concept are as follows.

CP functions are distinguished from user plane (UP) functions, and independent scalability, evolution, flexible deployments (e.g., centralized location or distributed (remote) location) are allowed.

Function design is modularized (which enables flexible and efficient network slicing, for example).

Procedures as services (i.e., a set of interactions between NFs) are defined such that they are applicable to anywhere.

If required, each NF can directly interact with another NF. The architecture does not exclude use of an intermediate function such that a control plane message can be routed.

Dependence between an access network (AN) and a core network (CN) is minimized. The architecture is defined as a converged core network having a common AN-CN interface which integrates different access types (e.g., 3GPP access and non-3GPP access).

A unified authentication framework is supported.

"Stateless" NFs in which "compute" resource is separated from "storage" resource is supported.

Capability extension is supported.

Concurrent access is supported for local and centralized services. UP functions may be deployed in proximity to an access network in order to support access to a low-latency service and a local data network.

Roaming for home routed traffic as well as local breakout (LBO) traffic in visited PLMN is supported.

The 5G system is defined based on services, and interaction between network functions in the architecture for the 5G system may be represented through the two methods below.

Serve-based representation (FIG. 8): Network functions (e.g., AMF) in the control plane (CP) allow other authenticated network functions to access services thereof. This representation includes a point-to-point reference point as necessary.

Reference point representation (FIG. 9): this represents interaction between NF services in NFs described by a point-to-point reference point (e.g., N11) between two NFs (e.g., ANF and SNF).

FIG. 8 illustrates a wireless communication system architecture to which the present invention is applicable.

The service-based interface illustrated in FIG. 8 shows a set of services provided/exposed by a predetermined NF. The service-based interface is used in the control plane.

Referring to FIG. 8, the 5G system architecture may include various components (i.e., network functions (NFs)). FIG. 8 shows some of the components, an authentication server function (AUSF), a (core) access and mobility management function (AMF), a session management function (SMF), a policy control function (PCF), an application function (AF), a unified data management (UDM), a data network (DN), a user plane function (UPF), a network exposure function (NEF), an NF repository function (NRF), a (radio) access network (R)AN), and a user equipment (UE).

The NFs support the following functions.

The AUSF store data for UE authentication.

The AMF provides a function for access and mobility management in units of UE and may be connected to one AMF per UE basically.

Specifically, the AMF supports functions such as signaling between CN nodes for mobility between 3GPP access networks, termination of a radio access network (RAN) CP interface (i.e., N2 interface), termination of NAS signaling (N1), NAS signaling security (NAS ciphering and integrity protection), AC security control, registration management (registration area management), connection control, idle mode UE reachability (including control and execution of paging retransmission), mobility management control (subscription and policy), intra-system mobility and inter-system mobility support, network slicing support, SMF selection, lawful intercept (with respect to interface to AMF event and L1 system), provision of session management (SM) message delivery between UE and SMF, transparent proxy for SM message routing, access authentication, access authorization including roaming right check, provision of SMS message delivery between UE and SMSF, security anchor function (SEA), and security context management (SCM).

Some or all functions of the AMF may be supported in a single instance of one AMF.

The DN refers to an operator service, Internet access or third party service and the like, for example. The DN transmits a downlink protocol data unit (PDU) to the UPF or receives, from the UPF, a PDU transmitted from the UE.

The PCF receives information about packet flow from an application server and provides a function of determining policies such as mobility management and session management. Specifically, the PCF supports unified policy framework support for controlling network operation, provision of policy rules such that CP functions (e.g., AMF, SMF, and the like) enforce the policy rules, and realization of a front end for accessing related subscription information for policy determination in user data repository (UDR).

The SMF provides a session management function and may be managed by different SMFs per session when the UE has a plurality of sessions.

Specifically, the SMF supports session management (e.g., session establishment, correction and cancellation including maintenance of a tunnel between the UDR and AN node), UE IP address allocation and management (including optional authentication), selection and control of UP function, setting of traffic steering for the UPF to route traffic to an appropriate destination, termination of interface to policy control functions, implementation of control part of policy and QoS, lawful intercept (with respect to interface to SM event and LI system), termination of SM part of NAS message, downlink data notification, AN specific SM information initiator (delivery to AN through N2 via AMF), determination of SSC mode of session, and roaming.

Some or all functions of the SMF may be supported in a single instance of one SMF.

The UDM stores user subscription data, policy data and the like. The UDM includes two parts, that is, application front end (FE) and a user data repository (UDR).

The FE includes a UDM FE in charge of location management, subscription management and credential processing and the like, and a PCF in charge of policy control. The UDR stores data necessary for functions provided by the UDM-FE and a policy profile required by the PCF. Data stored in the UDR includes a subscription identifier, security credential, and user subscription data and policy data including access and mobility related subscription data and session related subscription data. The UDM-FE accesses subscription information stored in the UDR and supports functions such as authentication credential processing, user identification handling, access authentication, registration/mobility management, subscription management, and SMS management.

The UPF forwards a downlink PDU received from the DN to the UE via a (R)AN and forwards an uplink PDU received from the UE to the DN via the (R)AN.

Specifically, the UPF supports functions such as anchor point for intra/inter RAT mobility, an external PDU session point of interconnect to a data network, packet routing and forwarding, user plane part of inspection and policy rule implementation, lawful intercept, traffic usage reporting, an uplink classifier for supporting routing of traffic flow to a data network, a branch point for supporting multi-homed PDU session, QoS handling for user plane (e.g., packet filtering, gating, and uplink/downlink rate implementation), uplink traffic verification (SDF mapping between service data flow (SDF) and QoS flow), transport level packet marking in uplink and downlink, downlink packet buffering and downlink data notification triggering. Some or all functions of the UPF may be supported in a single instance of one UPF.

The AF interacts with a 3GPP core network for service provision (e.g., supporting functions such as application influence on traffic routing, network capability exposure access, and interaction with policy framework for policy control).

The NEF provides a means for safely exposing services and capabilities for 3rd party, internal exposure/re-exposure, application function and edge computing, for example, provided by 3GPP network functions. The NEF receives information (based on exposed capabilities of other network functions) from other network functions. The NEF may store received information as structured data using standardized interface to data storage network functions. The stored information may be re-exposed to other network functions and application functions by the NEF and used for other purposes such as analysis.

The NRF supports a service discovery function. The NRF receives an NF discovery request from an NF instance and provides discovered information on the NF instance to the NF instance. Further, the NRF maintains available NF instances and services supported by the NF instances.

(R)AN is a generic term for new radio access networks supporting both evolved E-UTRAN which is an evolved version of 4G radio access technology and new radio access technology (new ratio (NR)) (e.g., gNB).

The gNB supports functions such as functions for radio resource management (i.e., radio bearer control, radio admission control, connection mobility control, dynamic allocation of resources to UE on uplink/downlink (i.e., scheduling), Internet protocol (IP) header compression, encryption of user data stream and integrity protection, selection of AMF at the time of UE attachment when routing to AMF is not determined from information provided to the UE, user plane data routing to UPFs, control plane information routing to AMF, connection setup and cancellation, scheduling and transmission of a paging message (generated from AMF), scheduling and transmission of system broadcast information (generated from AMF or operating and maintenance (O&M), setting of measurement and measurement report for mobility and scheduling, transport level packet marking on uplink, session management, support of network slicing, QoS flow management and mapping to data radio bearer, support of UE in an inactive mode, a NAS message distribution function, a NAS node selection function, radio access network sharing, dual connectivity, and tight interworking between NR and E-UTRA.

The UE refers to a user device. The UE may also be called a terminal, mobile equipment (UE), a mobile station and the like. Further, the user device may be a portable device such as a notebook computer, a cellular phone, a personal digital assistant (PDA), a smartphone, and a multimedia device, or may be a device which is not portable such as a personal computer (PC) and a vehicle-mounted device.

Although an unstructured data storage network function (UDSF) and a structured data storage network function (SDSF) are not shown in FIG. 8, all NFs shown in FIG. 8 may perform interactions with the UDSF and SDSF as necessary.

SDSF is an optional function for supporting a function of storing and retrieving information as structured data by any NEF.

UDSF is an optional function for supporting a function of storing and retrieving information as unstructured data by any NF.

Service-based interfaces included in the 5G system architecture shown in FIG. 8 are described below.

Namf: Service-based interface exhibited by AMF
Nsmf: Service-based interface exhibited by SMF
Nnef: Service-based interface exhibited by NEF
Npcf: Service-based interface exhibited by PCF
Nudm: Service-based interface exhibited by UDM
Naf: Service-based interface exhibited by AF
Nnrf: Service-based interface exhibited by NRF
Nausf: Service-based interface exhibited by AUSF NF service is a kind of capability exposed by an NF (i.e., NF service provider) to another NF (i.e., NF service consumer) through a service-based interface. An NF may expose one or more NF services. To define NF services, the following standards are applied.

NF services are derived from information flow for describing an end-to-end function.

Perfect end-to-end message flow is described by a sequence of NF service invocation.

Two operations of NFs to provide services thereof through a service-based interface are as follows.

i) "Request-response": A control plane NF_B (i.e., NF service provider) receives a request for provision of a specific NF service (including execution of operation and/or provision of information) from another control plane NF_A (i.e., NF service consumer). NF_B responds with an NF service result based on information provided by NF_A in the request.

To satisfy the request, NF_B may alternately consume NF services from other NFs. In a request-response mechanism, communication is performed between two NFs (i.e., provider and consumer) one to one.

ii) "Subscribe-Notify"

Control plane NF_A (i.e., NF service consumer) subscribes to NF service provided by another control plane NF_B (i.e., NF service provider). A plurality of control plane NFs may subscribe to the same control plane NF service. NF_B notifies NFs subscribed to and interested in the NF service of results of the NF service. A subscription request from a consumer may include a notification request for notification which is triggered through periodic update or a specific event (e.g., change of requested information, arrival at a specific critical value, or the like). This mechanism includes cases in which NFs (e.g., NF_B) implicitly subscribe to specific notification without explicit subscription request (e.g., due to a successful registration procedure).

FIG. 9 illustrates a wireless communication system architecture to which the present invention is applicable.

In the 3GPP system, a conceptual link connecting NFs in a 5G system is defined as a reference point. Reference points included in the 5G system architecture shown in FIG. 9 are described below.

- N1 (or NG1): Reference point between the UE and the AMF
- N2 (or NG2): Reference point between the (R)AN and the AMF
- N3 (or NG3): Reference point between the (R)AN and the UPF
- N4 (NG4): Reference point between the SMF and the UPF
- N5 (NG5): Reference point between the PCF and the AF
- N6 (or NG6): Reference point between the UPF and a data network
- N7 (NG7): Reference point between the SMF and the PCF
- N24 (NG24): Reference point between the PCF in a visited network and the PCF in a home network
- N8 (NG8): Reference point between the UDM and the AMF
- N9 (NG9): Reference point between two core UPFs
- N10 (NG10): Reference point between the UDM and the SMF
- N11 (NG11): Reference point between the AMF and the SMF
- N12 (NG12): Reference point between the AMF and the AUSF
- N13 (NG13): Reference point between the UDM and the authentication server function (AUSF)
- N14 (NG14): Reference point between two AMFs
- N15 (NG15): Reference point between the PCF and the AMF in the case of a non-roaming scenario and reference point between the PCF and the AMF in a visited network in the case of a roaming scenario
- N16 (NG16): Reference point between two SMFs (reference point between the SMF in a visited network and the SMF in a home network in the case of a roaming scenario)
- N17 (NG17): Reference point between the AMF and an EIR
- N18 (NG18): Reference point between any NF and the UDSF
- N19 (NG19): Reference point between the NEF and the SDSF Although FIG. 9 illustrates a reference model for cases in which a UE accesses a single DN using a single PDU session for convenience of description, the present invention is not limited thereto.

FIG. 10 illustrates a wireless communication system architecture to which the present invention is applicable.

FIG. 10 illustrates a non-roaming 5G system architecture for a UE which concurrently accesses two (local and central) data networks (DNs) through multiple PDU sessions using reference point representation.

FIG. 10 illustrates an architecture for multiple PDU sessions in a case in which two SMFs are selected for different PDU sessions. Here, each SMF may have capability of controlling both local and central UPFs in PDU sessions.

FIG. 11 illustrates a wireless communication system architecture to which the present invention is applicable.

FIG. 11 illustrates a non-roaming 5G system architecture for cases in which concurrent accesses to two (i.e., local and central) data networks (DNs) are provided in a single PDU session using reference point representation.

FIG. 12 illustrates a wireless communication system architecture to which the present invention is applicable.

FIG. 12 illustrates a roaming 5G system architecture in the case of an LBO scenario having a service-based interface in a control plane.

FIG. 13 illustrates a wireless communication system architecture to which the present invention is applicable.

FIG. 13 illustrates a roaming 5G system architecture in the case of a home routed scenario having a service-based interface in a control plane.

FIG. 14 illustrates a wireless communication system architecture to which the present invention is applicable.

FIG. 14 illustrates a roaming 5G system architecture in the case of an LBO scenario using reference point representation.

FIG. 15 illustrates a wireless communication system architecture to which the present invention is applicable.

FIG. 15 illustrates a roaming 5G system architecture in the case of a home routed scenario using reference point representation.

FIG. 16 illustrates an NG-RAN architecture to which the present invention applicable.

Referring to FIG. 16, a new generation radio access network (NG-RAN) is composed of gNBs (NR NodeBs) and/or eNBs (eNodeBs) which provide termination of a user plane and control plane protocol to UEs.

gNBs, and a gNB and an eNB connected 5GC are connected to each other using an Xn interface. Further, gNBs and eNBs are connected to 5GC using an NG interface, more specifically, connected to AMFs using an NG-C interface (i.e., N2 reference point) which is a control plane interface between the NG-RAN and 5GC and connected to UPFs using an NG-U interface (i.e., N3 reference point) which is a user plane interface between the NG-RAN and 5GC.

FIG. 17 is a diagram illustrating a radio protocol stack in a wireless communication system to which the present invention is applicable.

FIG. 17(*a*) illustrates a radio interface user plane protocol stack between a UE and a gNB and FIG. 17(*b*) illustrates a radio interface control plane protocol stack between a UE and a gNB.

A control plane refers to a passage through which control messages used for UEs and networks to manage calls are transmitted. A user plane refers to a passage through which data generated in an application layer, for example, audio data, Internet packet data or the like is transmitted.

Referring to FIG. 17(*a*), the user plane protocol stack may be divided into a first layer (Layer 1) (i.e., physical (PHY) layer) and a second layer (Layer 2).

Referring to FIG. 17(*b*), the control plane protocol stack may be divided into a first layer (i.e., PHY layer), a second layer, a third layer (i.e., radio resource control (RRC) layer) and a non-access stratum (NAS) layer.

The second layer is divided into a medium access control (MAC) sublayer, a radio link control (RLC) sublayer, a packet data convergence (PDC) protocol sublayer, and a service data adaptation protocol (SDAP) sublayer (in the case of the user plane).

Radio bearers are classified into two groups: a data radio bearer (DRB) for user plane data and a signaling radio bearer (SRB) for control plane data.

Hereinafter, each layer of the control plane and the user plane of radio protocols will be described.

1) The PHY layer corresponding to the first layer provides an information transfer service to a higher layer using a physical channel. The PHY layer is connected to the MAC sublayer located at a higher level through a transport channel, and data is transmitted between the MAC sublayer and the PHY layer through the transport channel. Transport channels are classified according to characteristics of transmission of data through a radio interface. Data is transmitted between different PHY layers, that is, a PHYU layer of a transmitter and a PHY layer of a receiver through a physical channel.

2) The MAC sublayer performs mapping between a logical channel and a transport channel, multiplexing/de-multiplexing of a MAC service data unit which belongs to one or different logical channels to/from a transport block (TB) and is transmitted from the PHY layer through a transport channel, scheduling information reporting, error correction through HARQ (hybrid automatic repeat request), priority handling between UEs using dynamic scheduling, priority handling between logical channels of a single UE using logical channel priority, and padding.

Different types of data deliver services provided by the MAC sublayer. Each logical channel type defines a type of transmitted information.

Logical channels are classified into two groups: control channels and traffic channels.

i) The control channels are used to deliver only control plane information and include the following.

Broadcast control channel (BCCH): a downlink channel for broadcasting system control information Paging control channel (PCCH): downlink channel carrying paging information and system information change notification Common control channel (CCCH): a channel for transmitting control information between a UE and a network. This channel is used for UEs which do not have RRC connection with networks.

Dedicated control channel (DCCH): a point-to-point bidirectional channel for transmitting dedicated control information between a UE and a network. This is used by a UE having RRC connection.

ii) The traffic channels are used for only user plane information.

Dedicated traffic channel (DTCH): a point-to-point channel dedicated for a single UE for user data delivery. The DTCH may be present on both uplink and downlink.

On downlink, a logical channel and a transport channel are connected as follows.

The BCCH may be mapped to the BCH. The BCCH may be mapped to a DL-SCH. The PCCH may be mapped to a PCH. The CCCH may be mapped to a DL-SCH. The DCCH may be mapped to a DL-SCH. The DTCH may be mapped to a DL-SCH.

On uplink, a logical channel and a transport channel are connected as follows. The CCCH may be mapped to a UL-SHC. The DCCH may be mapped to a UL-SCH. The DTCH may be mapped to a UL-SCH.

3) The RLC sublayer supports three transport modes: a transparent mode (TM), an unacknowledged mode (UM) and an acknowledged mode (AM).

RLC configuration may be applied per logical channel. The TM or AM is used in the case of SRB, whereas the UM or AM is used in the case of DRB.

The RLC sublayer performs forwarding of a higher layer PDU, sequence numbering independent of PDCP, error correction through ARQ (automatic repeat request), segmentation and re-segmentation, reassembly of SDU, RLC SDU discard, and RLC re-establishment.

4) PDCP sublayer for the user plane performs sequence numbering, header compression and decompression (only in the case of robust header compression (RoHC)), user data forwarding, reordering and duplicate detection (when forwarding to a layer higher than the PDCP is required), PDCP PDU routing (in the case of a split bearer), retransmission of PDCP SDU, ciphering and deciphering, PDCP SDU discard, PDCP re-establishment and data recovery for RLC AM, and duplication of PDCP PDU.

The PDCP sublayer for the control plane additionally performs sequence numbering, ciphering, deciphering and integrity protection, control plane data forwarding, duplicate detection, and duplication of PDCP PDU.

When duplication for a radio bearer is set by RRC, an additional RLC entity and an additional logical channel are added to the radio bearer in order to control duplicated PDCP PDUs. In PDCP, duplication includes transmission of the same PDCP PDUs twice. The first transmission is for forwarding to the original RLC entity and the second transmission is for forwarding to the additional RLC entity. Here, the original PDCP PDU and a duplicate thereof are not transmitted in the same transport block. Two different logical channels may belong to the same MAC entity (in the case of CA) or belong to different MAC entities (in the case of DC. In the former case, logical channel mapping restrictions are used to ensure that the original PDCP PDU and a duplicate thereof are not transmitted in the same transport block.

5) The SDAP sublayer performs i) mapping between a QoS flow and a data radio bearer and ii) QoS flow identifier (ID) marking in downlink and uplink packets.

Although a single protocol entity of SDAP is set for each individual PDU session, two SDAP entities may be set exceptionally in the case of dual connectivity (DC).

6) The RRC sublayer performs broadcast related to AS (Access Stratum) and NAS (Non-Access Stratum), paging initiated by 5GC or NG-RAN, establishment of RRC connection between a UE and NG-RAN, maintenance and release (additionally including correction and release of carrier aggregation and, additionally, correction and release of dual connectivity between E-UTRAN and NR or in NR), security function including key management, establishment, setting, maintenance and release of SRBs and DRBs, handover and context delivery, UE cell selection and re-release and control of cell selection/reselection, mobility function including mobility between RATs, QoS management function, UE measurement report and report control, radio link failure detection and recovery from radio link failure, and NAS message delivery from NAS to a UE and NAS message delivery from a UE to NAS.

Session and Service Continuity (SSC)

In 3GPP SA2, methods for supporting session and service continuity according to UE mobility are discussed.

In new generation systems (e.g., 5G system), a solution for supporting three SSC modes are discussed.

This solution assumes a PDU session present between a UER and a user plane function (which is referred to as a terminating user-plane function (TUPF) hereinafter but may be replaced by the aforementioned UPF). The TUPF terminates 3GPP user plane and interfaces to a data network.

1) Definition of SSC Modes

New generation systems support SSC modes below.

SSC mode 1: The same TUPF is maintained irrespective of access technology (e.g., RAT and cell) which is being used by a UE to access a network.

SSC mode 2: The same TUPF is maintained only through a subset (i.e., one or more but not all) of access network attachment points (e.g., cell and RAT) referred to as a serving area of the TUPF. When a UE is out of the serving area of the TUPF, the UE is served by a different TUPF suitable for a new attachment point to the network of the UE.

SSC mode 3: In this mode, a network allows establishment of UE continuity to the same data network (DN) via a new TUPF before connection between a UE and a previous TUPF is terminated. When a trigger condition is applied, the network selects a target TUPF suitable for a new attachment point to the network of the UE. When the two TUPFs are active, the UE actively rebinds an application from a previous address/prefix to a new address/prefix or waits until a flow bound to the previous address/prefix ends.

2) Mode Selection and Network Support

With respect to mode selection and network support, the following principle is applied.

When a UE requests a PDU session, the UE may indicate a requested SSC mode as part of PDU session setup signaling to a network. A method by which the UE determines the requested SSC mode will be described later.

A serving network receives a list of SSC modes supported per subscriber and per data network and a default SSC mode as part of subscription information from a subscription database.

The serving network selects an SSC mode by approving or correcting the requested SSC mode on the basis of the subscription information and/or local setup.

When the UE does not provide an SSC mode when requesting a new PDU session, the network selects the default SSC mode described in the subscription information (to connect to the data network) or applies local setup for selecting an SSC mode.

After selection of the SSC mode, the network (a) approves the PDU session request from the UE and indicates the approved selected SSC mode to the UE or (b) rejects the PDU session request and indicates that the selected SSC mode has been being used in another PDU session in the UE by transmitting the selected SSC mode and a cause value to the UE.

The SSC mode is applied per PDU session. The UE requests different SSC modes for different PDU sessions. That is, different PDU sessions concurrently activated for the same UE may have different SSC modes.

The SSC mode is not changed during lifetime of a PDU session.

TUPF selection: When a TUPF for a PDU session is selected, the network considers the current attachment point of the UE and the requested SSC mode.

3) SSC Mode 1

With respect to SSC mode 1, the following principle is applied.

The allocated TUPF is maintained during the lifetime of the PDU session. That is, the TUPF is not changed by the network.

4) SSC Mode 2

With respect to SSC mode 2, the following principle is applied.

Redirection trigger to different TUPFs: The network determines whether a TUPF allocated to a PDU session of the UE needs to be redirected on the basis of UE mobility and local policy (i.e., information about the serving area of the allocated TUPF).

Redirection procedure: The network cancels a user plane path associated with the current TUPF first and then sets up a user plane path corresponding to a new TUPF to redirect traffic of the UE to different TUPFs. The two solutions below are used. One solution stores the PDU session when the TUPF is reallocated. According to the other solution, the network cuts the PDU session of the UE corresponding to the current TUPF and requests the UE to immediately reactivate the PDU session (which is a result of selection of the new TUPF). During this process, the UE maintains the attached state. The network selects a TUPF on the basis of the current attachment point of the UE to the network.

5) SSC Mode 3

With respect to SSC mode 3, the following principle is applied.

Redirection trigger to different TUPFs: The network determines whether a TUPF allocated to a PDU session of the UE needs to be redirected on the basis of local policy (i.e., information about the serving area of the allocated TUPF).

Redirection procedure: The network indicates to the UE whether traffic on one of activated PDU sessions of the UE needs to be redirected. The network starts a timer and indicates a timer value to the UE. A user plane path is established toward a new TUPF. Two solutions below are used. According to one solution, a PDU session is reused for an additional user plane path. According to the other solution, an additional PDU session is re-established. The network selects a TUPF on the basis of the current attachment point of the UE to the network. When the UE transmits a request for an additional PDU session to the same DN without previous indication indicating that an activated PDU session needs to be redirected from the network, the network rejects the request of the UE.

When a new user plane path associated with a new TUPF has been established, the UE may perform one of the following options.

Option 1: The UE actively redirects an application flow bound to the previous TUPF to the new TUPF (using a higher layer session continuity mechanism, for example). When the UE completes redirection of the application flow to the new TUPF, the previous TUPF is released.

Option 2: The UE steers a new application flow to the new TUPF. The previous flow passing through the previous TUPF continues until the follow ends. All flows using the previous TUPF end, the previous TUPF is released. When option 2 is used, a multi-homed PDU session may be used to transmit the application flow bound to the previous TUPF. A tunnel between the previous TUPF and the new TUPF is used to transmit such flows.

If the previous TUPF has not been released when the timer expires or the network detects deactivation of the previous TUPF, the network releases the previous TUPF.

Session Management Per PDU Session

This solution is based on the following principle.

The SMF and the MMF are split in different network functions. When a UE registers with multiple network slice instances, the UE may be served by multiple SMFs. That is, multiple PDU sessions are established. Multiple PDU sessions (to the same or to different network slices) are established for a given UE. A PDU session can be in an idle state or active state.

UP connection (including data radio connection and NG3 tunnel establishing) can be activated for a single PDU session. UP connections for other PDU sessions (to the same or to other network slices) can be activated/deactivated independently.

The procedures for PDU session activation and deactivation are proposed.

Here, PDU session activation is transition to "Active" session state in the SMF and the UP connection is established. PDU session deactivation is transition to "Idle" session state in the SMF and the UP connection is released/deactivated.

Similar to the existing signaling management (SM) (i.e., active/idle transition management) in GPRS and EPS, this solution does not preclude to perform SM for all existing PDU sessions together. Whether to perform activation of all PDU sessions or activation of individual PDU session can be based on subscription and UE capability.

FIG. 18 illustrates a reference architecture of a wireless communication system to which the present invention is applicable.

FIG. 18 illustrates a reference architecture with three PDU sessions to different network slices with independent SMF.

A common control plane network function (CCNF) may include a mobility management function (AMF) or AAA function. The dedicated control plane network function (Ded. CP NF) may include the session management function (SMF) and optionally the policy control function (PCF).

FIG. 19 illustrates session/mobility state machines in a wireless communication system to which the present invention is applicable.

FIG. 19 illustrates multiple session state machines (one per established session) and a single mobility state machine.

FIG. 19 shows an independent session state machine per existing session (i.e., per network slice, or PDU session). The session state machine can be maintained as part of the SM context of the UE in the SMF. The machine state machine can also be maintained in the AMF.

The CCNF (e.g., AMF) knows the session state (Idle or Active) in SMFs for all the established PDU sessions. With this, in addition to the mobility context, the AMF also maintains state information for all established PDU sessions.

For example, if a PDU session is deactivated (i.e., the UP connection is released but context is kept in UE and SMF/UPF), the AMF knows that the corresponding SMF should not be updated when the UE moves and changes RAN node. In contrary, if a PDU session is activated, the AMF knows that the corresponding SMF should be updated with the new (R)AN node details (e.g., IP address, tunnel identifier, transport port ID, or other parameters) each time when a (R)AN node changes due to UE mobility.

FIG. 20 is a diagram illustrating a session activation procedure in a wireless communication system to which the present invention is applicable.

FIG. 20 illustrates a session activation procedure triggered by downlink data transmission (i.e., mobile terminate (MT) case) independent of other PDU sessions.

1. The UPF2 initiates an activate session request procedure for establishment of UP connection.

2. The SMF2 initiates an activate session request procedure towards the CCNF (e.g., AMF). The SMF2 includes session ID, QoS parameters, paging priority and UPF ID (needed for NG3 tunnel establishment, e.g., IP address, tunneling endpoint ID and/or transport layer port ID). If the CCSF has another activate session request procedure in progress with other SMF (e.g., SMF1) and the activate session request message from the SMF2 has equal or less paging priority than the one in progress, the CCSF does not initiates a new paging procedure to the UE.

3-4. If the AMF is in a standby state, the AMF initiates the paging procedure to the UE. The paging message includes the session ID corresponding to downlink packets arrived at the UPF2. If the AMF is in a ready state (i.e., there is an active session on going with UPF1), the CCNF sends a service notification message to the UE over the NG1 interface instead of performing a paging procedure.

4. The UE sends a service request message to the CCNF. The service request message includes the session ID if the session ID was present in step 3.

5-7. The CCNF (e.g., AMF) performs a UE context setup procedure towards the RAN node. The session state in the UE for this PDU session changes to "Active" and the UE is able to receive/send data.

8. The AMF responds to step 2 towards the SMF2 including RAN node UP information for NG3 tunnel establishment. If the CCNF has activate session request messages received from multiple SMFs, then multiple activate session response messages are responded to corresponding SMFs.

9. The SMF2 updates UPF2 with information necessary for NG3 tunnel establishment.

FIG. 21 is a diagram illustrating a session activation procedure in a wireless communication system to which the present invention is applicable.

FIG. 21 illustrates a session activation procedure triggered by uplink data transmission (i.e., mobile originated case) which is independent from activation of other PDU sessions.

1. Due to UL data for PDU session 2, the UE initiates RRC connection establishment with RAN node to transmit an initial NAS message. If the UE has an active session (i.e., in a ready state), the UE skips this step and performs step 3.

2. If the UE does not have any active sessions, the UE sends the service request message to the CCNF. The service request message includes the session ID that UE wants to activate.

3. If the UE has an active session (i.e., in a ready state), the UE sends a NAS SM session activation message which includes the session ID that UE wants to activate.

4-6. The CCNF (e.g., AMF) performs an activate session procedure with the SMF2. The SMF2 updates the UPF2, if needed, and replies to the AMF with the corresponding stored QoS parameters and UPF ID.

7-9. The CCNF (e.g., AMF) performs a UE context setup procedure to the RAN node. The session state in the UE for this PDU session changes to "Active" and the UE is able to receive/send data for this PDU session.

10-12. The AMF performs an update session procedure towards the associated SMF2 to inform the SMF2 and the UPF2 about the RAN node UP information for NG3 tunnel establishment.

The procedure for session deactivation includes release of UP connection (data radio connection and NG3 connection/tunnel). Although the context of the UE in the SMF and the NAS SM context in the UE are kept, the state is "Idle". The session deactivation procedure may be initiated by the RAN node.

UE Configuration Update Method

A differentiated service was rarely provided per UE because UEs of similar types exited. Furthermore, all UEs perform a TAU procedure according to mobility and perform a periodic TAU procedure in order to maintain UE reachability, in general.

Although a UE rarely requested special configuration related to mobility (e.g., DRX operation) to a network, when the UE requested PSM to the network, the network (i.e., MME) checked provider policy, parameter values requested by the UE, and subscription information of the corresponding UE and set the PSM for the corresponding UE and the UE operated according to such configuration from Release-12. Here, the PSM is an operation for access stratum (e.g., RRC layer) off for a period in which the UE performs periodic TAU (i.e., between TAU execution times) and is usefully applied to MTC (Machine Type Communication)/CIoT (Cellular Internet of Things) UEs for which UE power saving is important.

In Rel-13, extended idle mode DRX (eDRX) was introduced. When the UE includes an eDRX parameter in an attachment or TAU message to send a request for use of eDRX to the network, like the aforementioned PSM, the network (i.e., MME) configures eDRX permissibility and eDRX application parameter values for the UE according to provider policy, UE requirements and subscription information. In this manner, negotiation between the UE and the network about the eDRX parameter was performed.

As various vertical services (services which intensively provide only specific part of various functions provided by horizontal services) have been provided to develop 5G system which can easily provide differentiated services, the mobility on demand concept has been introduced. Accordingly, various mobility on demand concepts such as mobile originated (MO) only type communication in which paging is not performed, and mobility restriction through which a network defines a service area of the UE have been introduced. This will be a direction of the 5G system.

With the introduction of the aforementioned differentiated UE mobility form, it is not appropriate to use the conventional method through which the network negotiates configuration with respect to UE mobility at the attachment/TAU request of the UE. That is, the network needs to flexibly adjust behavior per UE, but only the operation in which the network confirms UE configuration at the request of the UE is defined in the current system. Accordingly, it is not easy to change mobility related parameters at a time/in a situation at/in which the network wants to adjust the parameters.

In other words, the network cannot change the UE mobility related parameters unless the UE performs TAU.

Particularly, in the case of a UE in a mobile initiated connection only (MICO) mode in which only connection initiated by a UE is supported, the UE does not receive paging from the network for the purpose of saving paging resources and UE power, does not perform TAU due to mobility, and has a considerably long period for periodic TAU. Accordingly, a considerably long time is required to release/off the MICO mode of the UE.

To solve such problems, the present invention proposes a method for enabling the network to perform UE configuration for UE mobility related parameters and operations at an appropriate time (i.e., enabling update).

In the 5G system, registration update which integrates the TAU (Tacking Area Update) procedure and the attachment procedure used in the conventional EPS was proposed. In the present description, the registration update procedure and the tracking area update procedure may be interpreted as the same/equivalent operation. In addition, the registration update procedure may be called a registration procedure or a registration area update procedure.

1) Embodiment 1: A Method by which a Network Triggers a Tracking Area Update/Registration Update Procedure of a UE FIG. 22 is a diagram illustrating a method for updating UE configuration according to an embodiment of the present invention.

Referring to FIG. 22, the network (e.g., AMF) determines whether UE mobility management (i.e., access and mobility related parameters/configuration) needs to be changed.

The network may determine whether mobility related configuration of a specific UE needs to be changed for various reasons such as policy change, change of position at which the UE performs reporting, interaction with an SMF, and network node state change.

The network may request (command) the UE to perform the registration update procedure (or TAU procedure) upon determining that mobility management of the UE (i.e., access and mobility related parameters/configuration) needs to be changed.

Here, mobility states of the UE may be classified as three cases (situations): a case (case A) in which the UE is in an idle mode and paging is available, a case (case B) in which the UE is in an idle mode and paging is not available, and a case (case C) in which the UE is in a CONNECTED mode.

1. When the network (e.g., AMF) wants to change operation control of the UE (i.e., access and mobility related parameters), the network may command the UE to perform the tracking area update/registration update procedure.

Here, the network may request registration update through paging while the UE is in the idle mode (e.g., connection management (CM)-idle mode) (case A) or through an additional NAS message (e.g., registration update command) while the UE is in the connected mode (e.g., CM-CONNECTED mode) (case C).

Case A) When the corresponding UE is in the idle mode and paging is available (and a time is required for periodic registration area update of the UE (i.e., for execution of the periodic registration update procedure)), the network (i.e., AMF) may request that the UE perform registration (area) update through paging.

Specifically, the AMF transmits a paging request message to a source gNB. Here, a registration request and/or mobility configuration update may be indicated in the cause or information element (IE) in the paging request message.

The source gNB transmits the paging request message to the UE. Here, the registration request and/or mobility configuration update may be indicated in the cause or IE in the paging request message.

Case C) When the corresponding UE is in the CONNECTED mode, the network (i.e., AMF) may request that the UE perform registration (area) update through a registration update command message.

Specifically, the AMF transmits the registration update command message to the source gNB. Here, mobility configuration update (or registration request) may be indicated in the cause or IE in the registration update command message.

The source gNB transmits the registration update command message to the UE. Here, mobility configuration update (or registration request) may be indicated in the cause or IE in the registration update command message.

Although FIG. 22 illustrates the operation in which the AMF transmits the registration update command message to the gNB and the gNB transmits the registration update command message to the UE for convenience of description, the present invention is not limited thereto. When the registration update command message is a NAS message, the AMF may transmit an N2 message in which the registration update command message has been encapsulated to the gNB and the gNB may transmit an RRC message in which the registration update command message has been encapsulated to the UE.

When the AMF transmits the conventional downlink NAS message, as illustrated in FIG. 22, the AMF may request registration (area) update (i.e., mobility configuration update) in the cause or IE in the downlink NAS message, or a new NAS message for requesting registration (area) update may be defined and used.

Case B) When the UE is in the idle mode but paging is not available, the network (i.e., AMF) may request that the UE perform registration (area) update through the registration update command message as in case C when the corresponding UE switches to the CONNECTED mode through a procedure initiated by the UE.

2. The UE recognizes operation for mobility configuration and initiates a registration procedure (or TAU procedure) (i.e., transmits a registration (update) request message or a TAU request message) when mobility configuration update (or registration request) is indicated in the cause or IE in the paging message or NAS message (e.g., registration update command message) or according to determination of situation (i.e., because the network directly requests that the UE trigger registration update).

That is, when the UE wants operation different from mobility operation that the UE requested to the network in previous registration update, the UE sends the registration update message (or registration (update) message or TAU request message) including the corresponding value to the network (i.e., AMF).

Here, when the value requesting tracking area update or registration update is included in the cause or IE of the paging message, the UE which has received the paging message performs the TAU (or registration (area) update) procedure even when the TA of the UE has not changed or the periodic TAU (or periodic registration (area) update) timer has not expired. Upon reception of the registration (update) message (or TAU request message) from the UE, the network (i.e., AMF) may update/re-configure a requested mobility on demand parameter of the UE through a registration (update) accept message (or TAU accept message).

In other words, the UE may perform the registration (update) procedure to transmit mobility related capabilities of the UE to the network (i.e., AMF) and the network (i.e., AMF) may transmit an accept message in response thereto to the UE such that the corresponding UE can update mobility related configuration (e.g., mobility restriction and mobility pattern related behavior) as in step 2.

Here, when the network (i.e., AMF) sends the registration accept (or TAU accept) message to the UE, the network may also request that the gNB update related parameters. For example, the related parameters may correspond to a mobility restriction value, a value with respect to paging on/off, a power saving related value, and the like.

The UE may operate according to updated mobility related parameter values after reception of the registration accept (or TAU accept) message. For example, when mobility restriction has been updated, whether to perform service request may be controlled according to a registration area in which the UE is located and operation with respect to paging transmission/reception may be controlled according to the paging on/off value.

2) Embodiment 2: UE Mobility Configuration Command Procedure

The present embodiment proposes a new procedure through which the network can trigger to change UE mobility management behavior when the network wants, separately from the registration (update) procedure/TAU procedure. The UE mobility configuration command procedure may be used for transmission of policy information as in embodiment 4 which will be described later as well as for mobility related configuration, and thus may also called a UE configuration update procedure.

FIG. 23 is a diagram illustrating a method for updating UE configuration according to an embodiment of the present invention.

Referring to FIG. 23, the network (e.g., AMF) determines whether UE mobility management (i.e., access and mobility related parameters) needs to be changed.

The network may determine whether mobility related configuration of a specific UE needs to be changed for various reasons such as policy change, change of location at which the UE performs reporting, interaction with an SMF, and network node condition change.

1. The network may transmit a mobility configuration update command to the UE upon determining that UE mobility management (i.e., access and mobility related parameters/configuration) needs to be changed.

As described above, the present invention is not limited to the term of the mobility configuration update command. This procedure may be used to transmit policy information as in embodiment 4 which will be described later, as described above, and thus the mobility configuration update command may also be referred to as a UE configuration update command.

Here, mobility states of the UE may be classified as three cases (situations): a case (case A) in which the UE is in an idle mode and paging is available, a case (case B) in which the UE is in an idle mode and paging is not available, and a case (case C) in which the UE is in a CONNECTED mode.

For example, in case A, the network (i.e., AMF) may initiate a UE configuration update procedure after establishment of signaling connection with the UE through a paging procedure. Alternatively, the network (i.e., AMF) may immediately perform the UE configuration update procedure in case C. In case B, the network (i.e., AMF) may perform the UE configuration update procedure as in case C when the UE switches to the CONNECTED mode through a procedure initiated by the UE.

1. The network (i.e., AMF) sends a mobility configuration update command (or UE configuration update command) message to the UE.

The mobility configuration update command (or UE configuration update command) message may include change in mobility restriction, change in paging reception operation of the UE, and the like. Parameters/information included in the mobility configuration update command (or UE configuration update command) message will be described in detail later.

Here, the network (i.e., AMF) may change (update) corresponding values in consideration of values previously configured for the UE, UE mobility capability information, and the like.

In addition, the network may command the gNB to change (update) mobility parameters with respect to the UE while sending the mobility configuration update command (or UE configuration update command) message to the UE in step 1. For example, the mobility parameters may correspond to a mobility restriction value, values with respect to paging on/off, power saving related values, and the like.

2. When the updated mobility related parameters/configuration in the mobility configuration update command (or UE configuration update command) message transmitted from the network (i.e., AMF) are applicable, the UE sends a mobility configuration update complete (or UE configuration update complete) message with respect thereto to the network (i.e., AMF).

However, if the UE cannot apply UE mobility configuration update (or UE configuration update) due to capability mismatch, subscription collision or the like, the UE may send a mobility configuration update reject (or UE configuration update reject) message to the network (i.e., AMF) in response to the mobility configuration update command (or UE configuration update command) message. In this case, the mobility configuration update reject (or UE configuration update reject) message may include a cause value.

3) Embodiment 3: Embodiment of Merging Embodiment 1 and Embodiment 2

The new command in embodiment 2 (mobility configuration update command message in embodiment 2) may be defined as a different term (e.g., UE configuration update command message).

Hereinafter, the mobility configuration update command message will be described as the UE configuration update command message.

Furthermore, the UE configuration update command message may be used to trigger UE registration update as well as being used to configure the mobility parameters (e.g., mobility restriction information (e.g., non-allowed/allowed TA (or registration area)) described in embodiment 2.

That is, if the network (i.e., AMF) wants to update parameter/information that the network need not negotiate with the UE, the network may include only desired parameter/information in the UE configuration update command message and send the UE configuration update command message to the UE to update only parameter/information applied to the UE. In this case, the UE may send a complete message (e.g., UE configuration update complete message) in response to the UE configuration update command message.

On the contrary, when the network (i.e., AMF) wants to update parameter/information that the network needs to negotiate with the UE, the network may request that the UE initiate registration through the UE configuration update command message.

Here, the network (i.e., AMF) may indicate that parameter/information is required to negotiate while requesting registration procedure triggering.

In addition, when the UE configuration update command message requests registration of the UE, the UE may respond with a registration request message instead of the complete message (e.g., UE configuration update complete message). In this case, the network (i.e., AMF) may consider that the updated parameter/information transmitted through the UE configuration update command message has been applied to the UE.

Further, the type of registration that the UE is requested to perform through the UE configuration update command message may be re-registration (i.e., not initial registration).

When the UE sends the registration request message to the network (i.e., AMF), the network (i.e., AMF) may update the value with respect to mobility restriction as well as re-negotiation of the mobility function of the UE (e.g., eDRX) while sending a registration accept message in response to the registration request message received from the UE.

When the UE is in the idle mode as in case A, the UE configuration update command message may be implemented in such a manner that the network (i.e., AMF) sends the UE configuration update command message after establishment of NAS connection with the UE through a paging procedure.

4) Embodiment 4

The new command (e.g., UE configuration update command or UE mobility configuration update command) proposed by the present invention may be used to update other pieces of UE information in addition to mobility management.

That is, the command may be used to update a UE route selection policy (URSP) in the policy control function. In this case, upon reception of UE policy information from the PCF through N15 interface, the AMF may use a new command (e.g., UE configuration update command or UE mobility configuration update command) procedure to update URSP information of the UE.

Here, the URSP may include an SSC mode selection policy (SSCMSP), a network slice selection policy (NSSP), a data network name (DNN) selection policy and/or a non-seamless offload policy.

5) Embodiment 5

The UE may send a registration request message or a PDU session establishment message in response to the new command (e.g., UE configuration update command or UE mobility configuration update command) proposed by the present invention.

In this case, the network (i.e., AMF) may consider that configuration/parameter update has been normally performed in the UE even when the network sends the new command (e.g., UE configuration update command or UE mobility configuration update command) to the UE and then receives the registration request message or the PDU session establishment message instead of the complete message or acknowledgement message in response thereto.

That is, the network (i.e., AMF) may consider the registration request or PDU session establishment message as a complete or acknowledgement message.

The UE may receive network slice selection assistance information (NSSAI) and/or configuration information of the UE through the new command (e.g., UE configuration update command or UE mobility configuration update command) and then trigger a registration procedure or a PDU session establishment procedure as a consecutive operation. Accordingly, an operation of the UE to send a response (i.e., complete or acknowledgement message) to the new command can be omitted and thus signaling overhead can be reduced.

For example, if the UE receives accepted/allowed indication with respect to two of three pieces of session management (SM)-NSSAI requested in a previous registration procedure and then receives accepted/allowed indication with respect to the third SM-MSSAI through a UE configuration update procedure, the UE can determine that PDU session request for the corresponding data network (DN) is available. In addition, the UE may request that the network (i.e., AMF) perform PDU session establishment as a consecutive operation. Accordingly, an acknowledgement/complete message with respect to the new command (e.g., UE configuration update command or UE mobility configuration update command) can be omitted.

6) Embodiment 6

Table 2 below shows information/parameters which can be updated through the new command (e.g., UE configuration update command or UE mobility configuration update command) proposed by the present invention.

The information/parameters shown in Table 2 are exemplary and the present invention is not limited thereto.

TABLE 2

| Information | Provided by NF | Ack required | Other NF impact |
|---|---|---|---|
| Mobility restriction | AMF | Required | In CONNECED mode to RAN, handover restriction list needs to be provided. |
| MICO handling | | Required | Only MICO off is available only in CONNECTED mode |
| Allowed S-NSSI information | | Required | No Allowed single-NSSAI list is updated, but there is no other NF impact: UE can request additional PDU session establishment. |
| Temporary UE ID, TA list | | Required | No |
| NITZ (Network Identity and Time Zone) information | | Not required | No |
| Access network discovery & selection policy | PCF | Required | No |
| URSP: UE Route Selection Policy | | Required | No |

In Table 2, "information (or parameter or policy)" represents UE information which can be provided or updated by the network through the new command (e.g., UE configuration update command or UE mobility configuration update command) proposed by the present invention. "Provided by NF" represents a network node (e.g., AMF or PCF) which can provide information (or parameter or policy) of each UE. "Ack required" represents whether a UE is requested to transmit a complete/acknowledgement message to the network (i.e., AMF) when the UE receives information (or parameter or policy) thereof "Other NF impact" represents impact on other NFs when information (or parameter or policy) of the corresponding UE is updated.

i) Temporary UE identity (ID) and TA (or registration area) list information may be included in the new command (e.g., UE configuration update command or UE mobility configuration update command) and transmitted.

For the temporary UE ID and TA (or registration area) list information, acknowledgement/complete of the UE is required.

ii) Slice related information of allowed S-NSSAI (single-NSSAI) may also be included in the new command (e.g., UE configuration update command or UE mobility configuration update command) and transmitted.

For the allowed S-NSSAI, acknowledgement/complete of the UE is required. Here, the UE may receive the allowed S-NSSAI and then send a registration request and/or PDU session establishment in response thereto as in embodiment 5.

iii) In the case of mobility restriction (e.g., non-allowed TA (or registration area) list and allowed TA (or registration area) list), if the corresponding UE is in a CONNECTED mode when the network (i.e., AMF) updates mobility restriction, the network (i.e., AMF) reflects the mobility restriction (e.g., non-allowed TA (or registration area) list and allowed TA (or registration area) list) in a handover restricted area and transmits the same to the gNB which serving the UE as in embodiment 2.

iv) In the case of change in mobile initiated connection only (MICO) handling, MICO off may be requested when the UE switches to a CONNECTED mode (e.g., CM-CONNECTED mode) through MO operation. That is, when the network wants to off the MICO mode upon determining that reachability according to paging is required (e.g., when activation of paging for the corresponding UE is requested in a third party application through PCF (policy function) or NEF (network extension function which is a network node executing the same function as the SCEF (Service Capability Exposure Function) in the EPS) for the corresponding UE) in a situation in which the network (i.e., AMF) configures the UE such that the UE uses MICO, the network (i.e., AMF) may include a registration update triggering request and a cause value (e.g., MICO mode off) in the new command (e.g., UE configuration update command or UE mobility configuration update command) and transmit the new command to the UE.

The UE may request registration update including an appropriate DRX cycle instead of requesting MICO upon reception of the command with respect to the registration update request and MICO mode off for the UE included in the new command (e.g., UE configuration update command or UE mobility configuration update command). Then, the network (i.e., AMF) may provide a periodic registration value and registration area information suitable for MICO off as well as an appropriate DRX value to the UE without activating MICO for the UE.

That is, for MICO mode on/off, it is necessary to transmit registration parameters (i.e., a registration area (or TA list) and a periodic registration timer) suitable for MICO off of the UE as well as executing MICO off, and thus the new command (e.g., UE configuration update command or UE mobility configuration update command) may be used to trigger the registration procedure of the UE.

When a MICO mode update IE (or MICO mode off indication) is included in the new command (e.g., UE configuration update command or UE mobility configuration update command) in order to trigger the registration procedure of the UE, the UE may request that the network (i.e., AMF) perform registration update.

When MICO mode update of the UE is required, the network (i.e., AMF) may replace the MICO mode update IE by an explicit indication indicating that registration update of the UE needs to be performed.

v) Network identity and time zone (NITZ) information may be provided to the UE through the new command (e.g., UE configuration update command or UE mobility configuration update command).

Here, when the UE receives only the NITZ information in the new command (e.g., UE configuration update command or UE mobility configuration update command), the UE need not send an acknowledgement/complete message to the network (i.e., AMF).

vi) Policy message/information (e.g., access network discovery & selection policy) or UE route selection policy (URSP)), which is UE policy information transmitted by the PCF to the AMF, may be included in a policy message container and sent to the UE by the AMF.

For the policy message/information, acknowledgement/complete of the UE is required.

vii) When registration of the UE is required as in embodiment 3, the network (i.e., AMF) may include an explicit indication for ordering the registration in the new command (e.g., UE configuration update command or UE mobility configuration update command).

Although such indication may be referred to as a registration update triggering indication/indicator (RUTI), this is exemplary and the present invention is not limited thereto.

This indication indicates that the UE is requested to start registration update and may indicate immediate execution of registration update of the UE. Alternatively, an additional indication may be included therein such that the UE can perform registration update after switching from the CONNECTED mode to the idle mode. Here, when a registration update execution time is not included in the indication, the UE may perform registration update after switching to the idle mode.

Here, when the network (i.e., AMF) order switching of the MICO mode (e.g., MICO deactivation), the network may instruct the UE to perform registration update without switching to the idle mode.

If the network (i.e., AMF) instructs the UE to request registration after switching to the idle mode, when the networks has transmitted RRC inactive assistance information such that an RRC inactive mode can be used for setup of N2 connection with the previous gNB, the UE may send an indication or message to the gNB such that the gNB does enter the RRC inactive mode in order to instruct the UE to switch to the idle mode after user data transmission/reception inactivity.

That is, upon reception of the indication or message indicating that the gNB should not enter the RRC inactive mode, the gNB performs an N2 release procedure when determining user data inactivity of the UE such that the UE can switch to the idle mode and thus perform the registration procedure. Here, the UE performs the registration procedure after switching to the idle mode in order to prevent unnecessary AMF redirection, such as slice change, which occurs when the gNB transmits a registration message to a new AMF.

Alternatively, the network (i.e., AMF) may command the UE to perform the registration procedure after switching to the idle mode, as described, and command the UE to perform the registration procedure even in the RRC inactive mode. In this case, the UE can perform the registration procedure without switching to the idle mode even when the UE has switched to the RRC inactive mode by the gNB due to user data inactivity.

When the network (i.e., AMF) transmits the new command (e.g., UE configuration update command or UE mobility configuration update command) including values other than NITZ among the parameters/information shown in Table 2, the UE needs to transmit acknowledgement for the command. Here, the acknowledgement may correspond to transmission of a complete/acknowledgement message for the new command or may be replaced by execution of registration update.

Hereinafter, the UE configuration update command message will be described in more detail.

This message is transmitted by a network to a UE in order to provide and update UE parameters/information.

Table 3 shows UE configuration update command message contents.

TABLE 3

| IEI | Information Element | Type/Reference | Presence |
|-----|--------------------|----------------|----------|
|     | Protocol discriminator | Protocol discriminator | M |
|     | Security header type | Security header type | M |
|     | (Generic) UE configuration update command message identity | Message type | M |
|     | UE Temporary Identity | UE Temporary Identity | O |
|     | TAI list | Tracking area identity list | O |
|     | Mobility Restriction info | Allowed/Non-Allowed TA list | O |
|     | Slice Info | Allowed S-NSSAI list | O |
|     | NITZ | Network Identity and Time Zone information | O |
|     | Policy message container | Policy message container | O |
|     | MICO mode update | MICO mode update | O |
|     | RUTI: Registration Update Triggering Indicator | RUTI: Registration Update Triggering Indicator | O |

In Table 3, the information element indicates the name of an information element. In the presence field, "M" indicates a mandatory IE which is included in a message all the time, "O" indicates an optional IE which may be included in a message or not, and "C" indicates a conditional IE which is included in a message only when a specific condition is satisfied.

Table 4 shows the policy message container of Table 3.

TABLE 4

Policy message container information element identity (IEI)
Length of Policy message container contents
Policy message container contents Table 5 shows the policy message container contents of Table 4.

TABLE 5

| IEI | Information Element | Type/Reference | Presence |
|-----|--------------------|----------------|----------|
|     | Protocol discriminator | Protocol discriminator | M |
|     | UE policy information | Message type | M |
|     | Access network discovery & selection policy | Access network discovery & selection policy | O |
|     | SSC Mode Selection Policy | SSC Mode Selection Policy | O |
|     | Network Slice Selection Policy | Network Slice Selection Policy | O |
|     | NN Selection Policy | DNN Selection Policy | O |
|     | Non-seamless Offload Policy | Non-seamless Offload Policy | O |

FIG. 24 is a diagram illustrating a UE configuration update method according to an embodiment of the present invention.

FIG. 24 illustrates an operation of the network (e.g., AMF).

Referring to FIG. 24, the network (i.e., AMF) determines whether UE configuration needs to be changed (or updated) (S2401).

When it is determined that UE configuration need not be changed (or updated) in step S2401, the procedure ends.

On the contrary, when it is determined that UE configuration needs to be changed (or updated) in step S2401, the network (i.e., AMF) determines whether the UE needs to perform a registration procedure (S2402).

Here, when negotiation between the UE and the network is not required to change UE configuration, it may be determined that the UE need not perform the registration procedure to update UE configuration. That is, re-registration of the UE may not be requested through the UE configuration update command message.

If negotiation between the UE and the network is required to change UE configuration, it may be determined that the UE needs to perform the registration procedure to update UE configuration.

If it is determined that the UE needs to perform the registration procedure in step S2402, the network (i.e., AMF) transmits the UE configuration update command message to the UE (S2403). Here, re-registration of the UE is not requested through the UE configuration update command message.

If it is determined that the UE needs to perform the registration procedure in step S2402, the network (i.e., AMF) transmits the UE configuration update command message to the UE (S2404). Here, re-registration of the UE is requested through the UE configuration update command message.

In steps S2403 and S2404, the UE configuration update command message includes updated UE parameters.

For example, the updated UE parameters may include at least one of mobility restriction, mobile initiated connection only (MICO), allowed network slice selection assistance information (NSSAI), temporary UE ID, a tracking area identity (TAI) list or network identity and time zone information.

Here, when the UE is in an idle mode in steps S2403 and S2404, the network (i.e., AMF) may transmit paging to the UE to switch the UE to a CONNECTED mode.

When re-registration of the UE is requested through the UE configuration update command message in step S2404, the network (i.e., AMF) may indicate a RAN to no longer enter an RRC inactive mode if the network has provided RRC inactive assistance information to the RAN such that the RAN can use the RRC inactive mode.

If the updated UE parameters include updated mobility restriction in steps S2403 and S2404, the network (i.e., AMF) may transmit handover restricted information in which the updated mobility restriction has been reflected to the RAN.

Meanwhile, the procedure shown in FIG. 24 may be used to update UE policy. That is, the network (i.e., AMF) receives updated policy information of the UE from a policy control function (PCF), the network may transmit the policy information of the UE to the UE. Here, the UE configuration update command message may be used.

Here, the policy information of the UE may include one or more of access network discovery and selection policy, SSC mode selection policy, DNN selection policy and non-seamless offload policy.

In FIG. 24, only any one of steps S2401 and S2402 may be performed (that is, any one step is omitted) or both the steps may be preformed. In addition, the order of steps S2401 and S2402 may be changed. Further, steps S2401 and S2402 may be performed as a single step although they are illustrated as separate steps.

FIG. 25 is a diagram illustrating a UE configuration update method according to an embodiment of the present invention.

FIG. 25 illustrates an operation of a UE.

Referring to FIG. 25, the UE receives the UE configuration update command message from a network (i.e., AMF) without a request of the UE (S2501).

Here, the UE configuration update command message includes updated UE parameters.

For example, the updated UE parameters may include at least one of mobility restriction, mobile initiated connection only (MICO), allowed network slice selection assistance information (NSSAI), temporary UE ID, a tracking area identity (TAI) list, or network identity and time zone information.

As described above, the procedure shown in FIG. 25 may be used to update UE policy. That is, when the network (i.e., AMF) receives updated policy information of the UE from a policy control function (PCF), the network may transmit the policy information of the UE to the UE. Here, the UE configuration update command message may be used.

Here, the policy information of the UE may include one or more of access network discovery and selection policy, SSC mode selection policy, DNN selection policy or non-seamless offload policy.

The UE determines whether acknowledgement for the UE configuration update command message is required (S2502).

Here, if the updated UE parameters include only the NITZ, acknowledgement for the UE configuration update command message may not be required.

When acknowledgement for the UE configuration update command message is required in step S2502, the UE transmits acknowledgement (e.g., UE configuration update complete message) to the network (i.e., AMF) (S2503).

When acknowledgement for the UE configuration update command message is not required in step S2502, the UE does not transmit acknowledgement (e.g., UE configuration update complete message) to the network (i.e., AMF).

The UE determines whether re-registration of the UE is requested through the UE configuration update command message (S2504).

If re-registration of the UE is requested through the UE configuration update command message in step S2504, the UE initiates a registration procedure (S2505).

Here, if the updated UE parameters include MICO (Mobile Initiated Connected Only), the registration procedure may be initiated while the UE is in a CONNECTED mode (e.g., CM-CONNNECTED mode).

If the updated UE parameters do not include MICO, the registration procedure may be initiated after the UE switches to an idle mode (e.g., CM-IDLE mode).

On the contrary, if re-registration of the UE is not requested through the UE configuration update command message in step S2504, the procedure ends.

In FIG. 25, only any one of steps S2501 and S2503 may be performed (that is, any one step is omitted) or both the steps may be preformed. In addition, the order of steps S2501 and S2503 may be changed. Further, steps S2401 and S2402 may be performed as a single step although they are illustrated as separate steps.

Overview of Devices to which the Present Invention can be Applied

FIG. 26 illustrates a block diagram of a communication device according to one embodiment of the present invention.

With reference to FIG. 26, a wireless communication system comprises a network node 2610 and a plurality of UEs 2620.

A network node 2610 comprises a processor 2611, memory 2612, and communication module 2613. The processor 2611 implements proposed functions, processes and/or methods proposed through FIG. 1 to FIG. 25. The processor 2611 can implement layers of wired/wireless interface protocol. The memory 2612, being connected to the processor 2611, stores various types of information for driving the processor 2611. The communication module 2613, being connected to the processor 2611, transmits and/or receives wired/wireless signals. Examples of the network node 2610 include an eNB(gNB), AMF, SMF, UPF, AUSF, NEF, NRF, PCF, UDM, AF, DN and so on. In particular, in case the network node 2610 is an eNB, the communication module 2613 can include a Radio Frequency (RF) unit for transmitting/receiving a radio signal.

The UE 2620 comprises a processor 2621, memory 2622, and communication module (or RF unit) 2623. The processor 2621 implements proposed functions, processes and/or methods proposed through FIG. 1 to FIG. 25. The processor 2621 can implement layers of wired/wireless interface protocol. The memory 2622, being connected to the processor 2621, stores various types of information for driving the processor 2621. The communication module 2623, being connected to the processor 2621, transmits and/or receives wired/wireless signals.

The memory 2612, 2622 can be installed inside or outside the processor 2611, 2621 and can be connected to the processor 2611, 2621 through various well-known means. Also, the network node 2610 (in the case of an eNB) and/or the UE 2620 can have a single antenna or multiple antennas.

FIG. 27 illustrates a block diagram of a wireless communication apparatus according to an embodiment of the present invention.

Particularly, in FIG. 27, the UE described above FIG. 26 will be exemplified in more detail.

Referring to FIG. 27, the UE includes a processor (or digital signal processor) 2710, RF module (RF unit) 2735, power management module 2705, antenna 2740, battery 2755, display 2715, keypad 2720, memory 2730, Subscriber Identification Module (SIM) card 2725 (which may be optional), speaker 2745 and microphone 2750. The UE may include a single antenna or multiple antennas.

The processor 2710 may be configured to implement the functions, procedures and/or methods proposed by the present invention as described in FIG. 1-25. Layers of a wireless interface protocol may be implemented by the processor 2710.

The memory 2730 is connected to the processor 2710 and stores information related to operations of the processor 2710. The memory 2730 may be located inside or outside the processor 2710 and may be connected to the processors 2710 through various well-known means.

A user enters instructional information, such as a telephone number, for example, by pushing the buttons of a keypad 2720 or by voice activation using the microphone 2750. The microprocessor 2710 receives and processes the instructional information to perform the appropriate function, such as to dial the telephone number. Operational data may be retrieved from the SIM card 2725 or the memory module 2730 to perform the function. Furthermore, the processor 2710 may display the instructional and operational information on the display 2715 for the user's reference and convenience.

The RF module 2735 is connected to the processor 2710, transmits and/or receives an RF signal. The processor 2710 issues instructional information to the RF module 2735, to initiate communication, for example, transmits radio signals comprising voice communication data. The RF module 2735 comprises a receiver and a transmitter to receive and transmit radio signals. An antenna 2740 facilitates the transmission and reception of radio signals. Upon receiving radio signals, the RF module 2735 may forward and convert the signals to baseband frequency for processing by the processor 2710. The processed signals would be transformed into audible or readable information outputted via the speaker 2745.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system, 5G system are primarily described, but can be applied to various wireless communication systems in addition to the 3GPP LTE/LTE-A system, 5G system.

What is claimed is:

1. A method for updating a configuration of user equipment (UE) by an access and mobility management function (AMF) in a wireless communication system, the method comprising:
   determining whether at least one UE parameter related to the configuration of the UE needs to be updated;
   transmitting a UE configuration update command message to the UE when the at least one UE parameter needs to be updated; and
   receiving a UE configuration update complete message from the UE when acknowledgement for the UE configuration update command message is requested,
   wherein the UE configuration update command message includes an updated UE parameter and represents whether the UE needs to perform a registration procedure for the updated UE parameter, and wherein, based on the updated UE parameter including a MICO (Mobile Initiated Connected Only) parameter, the registration procedure is initiated while the UE is in a CONNECTED mode.

2. The method of claim 1, wherein re-registration of the UE is requested by the UE configuration update command message when the UE needs to perform the registration procedure.

3. The method of claim 1, wherein re-registration of the UE is not requested by the UE configuration update command message when negotiation between the UE and a network is not required to change the configuration of the UE.

4. The method of claim 1, wherein the registration procedure is performed to update the configuration of the UE when negotiation between the UE and the network is required to change the configuration of the UE.

5. The method of claim 1, further comprising indicating a radio access network (RAN) to no longer enter a Radio Resource Control (RRC) inactive mode when the AMF provides RRC inactive assistance information to the RAN such that the RAN is able to use the RRC inactive mode.

6. The method of claim 1, wherein transmitting the UE configuration update command message further comprises transmitting paging to the UE to switch the UE to the CONNECTED mode when the UE is in an idle mode.

7. The method of claim 1, further comprising transmitting handover restricted information in which updated mobility restriction has been reflected to a radio access network (RAN) when the updated UE parameter includes the updated mobility restriction.

8. The method of claim 1, wherein the updated UE parameter includes one or more of mobility restriction, the MICO parameter, allowed network slice selection assistance information (NSSAI), temporary UE ID, a tracking area identity (TAI) list, or network identity and time zone information (NITZ).

9. The method of claim 1, wherein the UE configuration update command message includes policy information of the UE when updated policy information of the UE is received from a policy control function (PCF).

10. The method of claim 9, wherein the policy information of the UE includes one or more of an access network discovery and selection policy, a session and service continuity (SSC) mode selection policy, a data network name (DNN) selection policy, or a non-seamless offload policy.

11. A method for updating a configuration of user equipment (UE) in a wireless communication system, the method comprising:
receiving, by the UE, a UE configuration update command message from an access and mobility management function (AMF) without a request of the UE;
transmitting a UE configuration update complete message to the AMF when acknowledgement for the UE configuration update command message is requested; and
initiating a registration procedure when re-registration of the UE is requested by the UE configuration update command message,
wherein the UE configuration update command message includes an updated UE parameter and represents whether the UE needs to perform the registration procedure for the updated UE parameter, and
wherein, based on the updated UE parameter including a MICO (Mobile Initiated Connected Only) parameter, the registration procedure is initiated while the UE is in a CONNECTED mode.

12. The method of claim 11, wherein, based on the updated UE parameter not including the MICO parameter, the registration procedure is initiated after the UE switches to an idle mode.

13. The method of claim 11, wherein, based on the updated UE parameter including only network identity and time zone (NITZ) information, the acknowledgement for the UE configuration update command message is not requested.

14. The method of claim 11, wherein the updated UE parameter includes one or more of mobility restriction, the MICO parameter, allowed network slice selection assistance information (NSSAI), temporary UE ID, a tracking area identity (TAI) list, or network identity and time zone information (NITZ).

15. The method of claim 11, wherein receiving the UE configuration update command message further comprises receiving paging to switch the UE to the CONNECTED mode from the AMF when the UE is in an idle mode.

* * * * *